US010150544B2

(12) United States Patent
Schibli

(10) Patent No.: US 10,150,544 B2
(45) Date of Patent: Dec. 11, 2018

(54) PERSONAL WATERCRAFT FOR AMPLIFYING MANUAL ROWING OR PADDLING WITH PROPULSION

(71) Applicant: Nikolaus Peter Schibli, Leysin (CH)

(72) Inventor: Nikolaus Peter Schibli, Leysin (CH)

(73) Assignee: R&D Sports LLC, Sheridan, WY (US)

( * ) Notice: Subject to any disclaimer, the term of this patent is extended or adjusted under 35 U.S.C. 154(b) by 0 days.

(21) Appl. No.: 15/728,548

(22) Filed: Oct. 10, 2017

(65) Prior Publication Data

US 2018/0099734 A1    Apr. 12, 2018

Related U.S. Application Data

(60) Provisional application No. 62/453,814, filed on Feb. 2, 2017, provisional application No. 62/406,971, filed on Oct. 12, 2016.

(51) Int. Cl.
| | | |
|---|---|---|
| *B63H 16/08* | (2006.01) | |
| *B63B 35/79* | (2006.01) | |
| *B63H 21/21* | (2006.01) | |
| *G01S 15/93* | (2006.01) | |

(52) U.S. Cl.
CPC ......... *B63H 16/14* (2013.01); *B63B 35/7943* (2013.01); *B63H 16/08* (2013.01); *B63H 21/21* (2013.01); *G01S 15/93* (2013.01); *B63B 2201/18* (2013.01); *B63H 2021/216* (2013.01)

(58) Field of Classification Search
CPC ..... B63B 35/73; B63B 35/79; B63B 35/7943; B63H 21/17; B63H 21/21; B63H 16/08; B63H 16/14; G05D 1/00
USPC .......... 114/55.56; 440/1; 441/65, 74; 701/21
See application file for complete search history.

(56) References Cited

U.S. PATENT DOCUMENTS

| | | | |
|---|---|---|---|
| 3,262,413 A | 7/1966 | Douglas et al. | |
| 3,463,116 A | 3/1969 | Dawson | |
| 3,995,578 A | 12/1976 | McCullough | |
| 5,017,166 A | 5/1991 | Chang | |
| 6,142,840 A | 11/2000 | Efthymiou | |
| 6,409,560 B1 | 6/2002 | Austin | |
| 6,702,634 B2 | 3/2004 | Jung | |
| 6,823,813 B2 | 11/2004 | Mazin | |
| 7,207,282 B1 | 4/2007 | Ruan et al. | |
| 7,226,329 B2 | 6/2007 | Railey | |
| 8,070,544 B2 | 12/2011 | Roman | |

(Continued)

FOREIGN PATENT DOCUMENTS

| | | |
|---|---|---|
| JP | H07156880 A | 6/1995 |
| JP | 2013063708 A | 4/2013 |

OTHER PUBLICATIONS

Search Report under Section 17 from the United Kingdom Intellectual Property Office dated Mar. 28, 2018 for the UK counterpart application GB1716607.5.

(Continued)

*Primary Examiner* — Lars A Olson

(57) ABSTRACT

A powered watercraft system including a watercraft body, a propulsion system, a sensor configured to measure a value indicative of a manually-generated time-variable first propulsive force resulting from a body motion of the user to move the watercraft body, and a controller configured control the propulsion system to generate a second propulsive force for powering the watercraft body based on the value indicative of the first propulsive force, the generated second propulsive force being at least partially contemporary with the first propulsive force.

20 Claims, 19 Drawing Sheets

(56) References Cited

U.S. PATENT DOCUMENTS

| | | |
|---|---|---|
| 9,061,747 B2 | 6/2015 | Roman |
| 9,327,165 B2 | 5/2016 | Melendez |
| 2002/0142679 A1 | 10/2002 | Ibata et al. |
| 2003/0167991 A1 | 9/2003 | Namanny |
| 2008/0132127 A1 | 6/2008 | Jansen |
| 2010/0167606 A1 | 7/2010 | Luecker et al. |
| 2011/0055423 A1 | 3/2011 | Railey |
| 2011/0201238 A1 | 8/2011 | Rott et al. |
| 2015/0104985 A1 | 4/2015 | Langelaan |
| 2015/0357845 A1 | 12/2015 | Railey |

OTHER PUBLICATIONS

Bulten, Norbert Willem Herman, "Numerical analysis of a waterjet propulsion system," Dissertation Abstracts International 68.02 (2006).

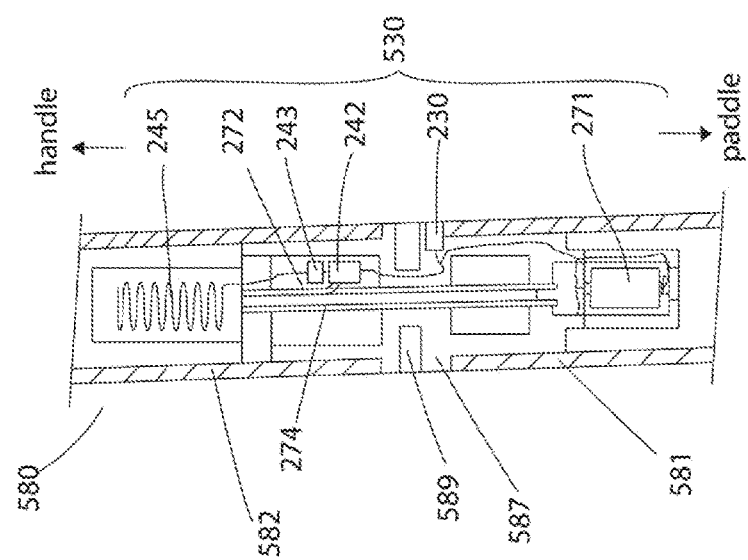
FIG. 7D
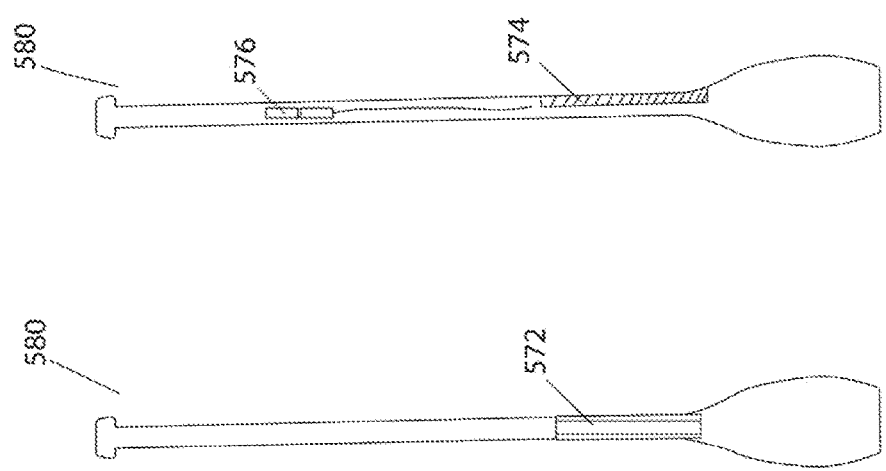
FIG. 7C
FIG. 7B

PERSONAL WATERCRAFT FOR AMPLIFYING MANUAL ROWING OR PADDLING WITH PROPULSION

CROSS-REFERENCE TO RELATED APPLICATIONS

The present application claims priority to the United States provisional patent applications with Application Ser. No. 62/406,971 filed on Oct. 12, 2016, and Application Ser. No. 62/453,814 filed on Feb. 2, 2017, the entire contents of these two documents herewith incorporated by reference.

FIELD OF THE INVENTION

The present invention relates to the fields of powered surfboards, kayaks, canoes, rafts, and stand-up paddle (SUP) boards, body boards, rowing boats, hydrofoil boards, diving propulsion device, underwater and surface-water jetpacks, and powered versions of other types of watercrafts, for personal recreational and professional use.

BACKGROUND ART

Several powered watercrafts have been proposed in the past. For example, in the field of surfboards, U.S. Pat. No. 3,463,116 describes a board propelled by a rear-mounted gasoline engine designed to reduce the size and visual impact of the engine compartment. U.S. Pat. No. 3,262,413 describes another gasoline powered surfboard, with an engine mounted entirely inside the body. Evidently, these gasoline-powered boards shared substantial drawbacks including noise and smoke emissions, fuel and oil leaks and the consequential environmental concerns, increased weight, costs, and operational complexity. Appearance and performance characteristics were totally unlike those which surfers and paddlers expected from conventional boards or other types of personal watercrafts.

Moreover, electric-powered surfboards have also been developed. For example, U.S. Pat. Pub. No. 2003/0167991 describes a small electric-powered propeller unit mounted on a surfboard fin. U.S. Pat. No. 7,207,282 describes a propeller-driven surfing device with an electric motor and power supply. U.S. Pat. No. 7,226,329 describes a surfboard with dual internal electric motors and impellers. U.S. Pat. No. 5,017,166 describes a motor-powered board with a large rear propeller and foot-operated control. U.S. Pat. No. 6,702,634 describes a board with an electric motor controlled by switches on a steering column, driving a helical propeller and including a retractable brake. U.S. Pat. No. 6,142,840 describes a board with a specialized shape and fin structure, dual water-jet pumps with angled intakes, and a wired handgrip control. U.S. Pat. No. 6,409,560 describes a motor housed in a box attached to the bottom of the board, with an external propeller and controls on a steering column. U.S. Pat. Pub. No. 2011/0201238 describes an electric-powered propulsion systems, associated operator-control systems, in which wireless controls are integrated with wearable marine accessories such as modified neoprene or fabric gloves, armbands, wristbands, hand straps, or gauntlets. Similarly, U.S. Pat. No. 9,061,747 describes a jet powered surfboard in which the power is controlled by a switch, and U.S. Pat. Pub. No. 2011/0056423 describes a control device for a powered surfboard to send signals from a control device from the hand of the surfer.

However, despite all the different solutions of the background art watercrafts that are powered, none of these designs are in widespread use, as most watersport enthusiasts still use the non-powered counterparts. One drawback is that the existing powered watercrafts are too heavy for frequent recreational use, and add significant weight that reduced their portability. In addition, the control of the propulsion of powered watercrafts is usually difficult and requires training in the control device and its setup, for example via a joystick, throttle, pedals or remote control. Moreover, the powered watercrafts totally remove the natural feeling of operating these devices by manual paddling and rowing. These difficulties in controlling the power leads to a less desirable experience.

Accordingly, in light of the deficiencies of the background art devices, advanced and substantially improved solutions are desired in the field of powered watercrafts, to improve user-friendliness and user-experience, reduce power consumption, reduce costs, simplify operability, reduce weight and increase environmental sustainability.

SUMMARY

According to one aspect of the present invention, a powered watercraft system is provided. Preferably, the system includes, a watercraft body, a propulsion system, a sensor configured to measure a value indicative of a manually-generated time-variable first propulsive force resulting from a body motion of the user to move the watercraft body, and a controller configured control the propulsion system to generate a second propulsive force for powering the watercraft body based on the value indicative of the first propulsive force, the generated second propulsive force being at least partially contemporary with the first propulsive force.

According to another aspect of the present invention, a powered watercraft is provided. Preferably, the powered watercraft includes a watercraft body, a propulsion system, a device for receiving a value indicative of a manually-generated time-variable first propulsive force resulting from a body motion of the user to move the watercraft body, and a controller for controlling the propulsion system to generate a second propulsive force for powering the watercraft body based on the value indicative of the first propulsive force, the generated second propulsive force being at least partially contemporary with the first propulsive force.

According to still another aspect of the present invention, a propulsion container for attachment to a personal watercraft is provided. Preferably, the container includes a propulsion system, a device for receiving a value indicative of a manually-generated time-variable first propulsive force resulting from a body motion of the user to move the watercraft body; and a controller for controlling the propulsion system to generate a second propulsive force for powering the watercraft body based on the value indicative of the first propulsive force, the generated second propulsive force being at least partially contemporary with the first propulsive force.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 7B and 7C show exemplary paddles 580 to be used with watercraft 600, and FIG. 7D showing a cross-sectional view of an embodiment using strain gauges with a paddle 580 and wireless communication, paddle 580 and watercraft 600 forming a watercraft system, according to another embodiment;

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1C:
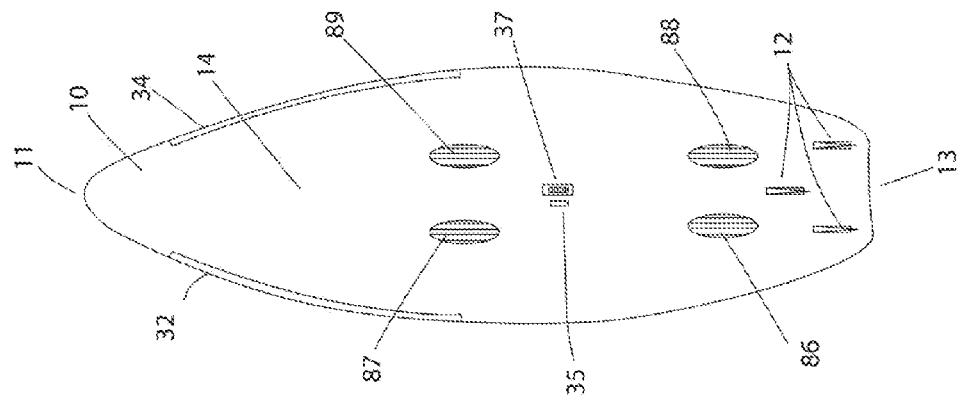
FIG. 1C shows a bottom view of hull of powered watercraft.
Figure 1B:
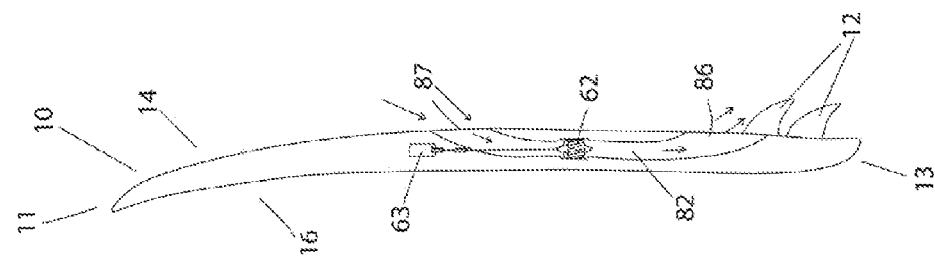
FIG. 1B shows a cross-sectional schematic view along line CS1 of FIG. 1A.
Figure 1A:
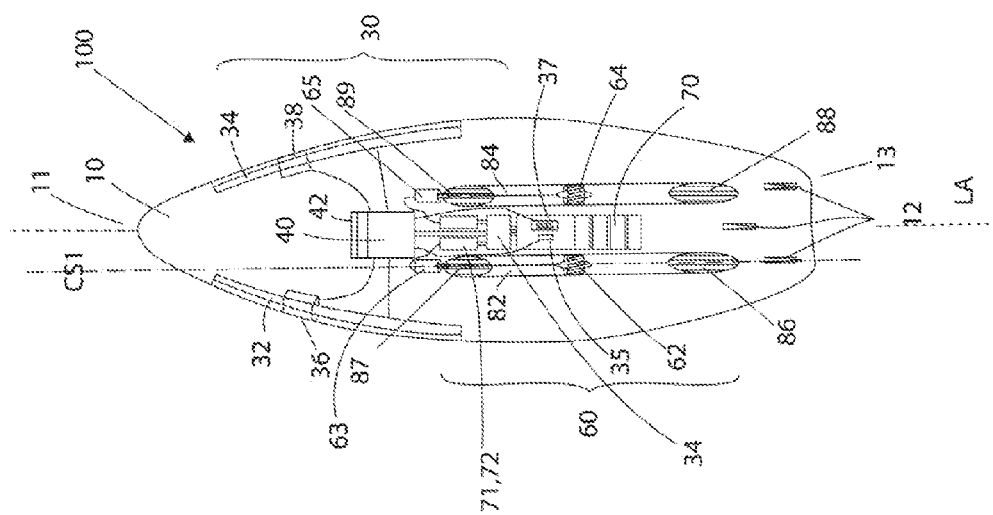
FIG. 1A shows a bottom schematic view of an open body 10 of powered watercraft 100 for illustration purposes.
Figure 1D:
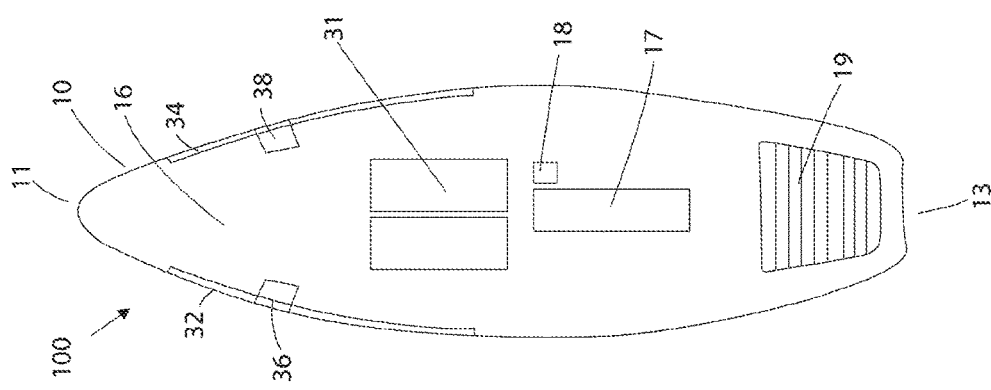
FIG. 1D shows a top view, according to one embodiment.

FIG. 1A shows a bottom schematic view of a powered watercraft 100 showing the interior of body 10 for explanation purposes, and FIG. 1B shows a cross-sectional schematic view along line CS1 of FIG. 1A, and FIG. 1C shows a bottom view of body 10 of powered watercraft, and FIG. 1D shows a top view of body 10 of powered watercraft 100. The powered watercraft 100 includes body 10 or other functionally equivalent device, such as but not limited to a hull, vessel, floating, non-floating, submersible, or partly submersible watercraft body, boat shell, fuselage, casing, structure, having a lower surface 14 for facing or being at least partially submerged into water body WB, and an upper surface 16 facing away from the water body, with three fins 12 at a tail or rear end 13 and a tip 11, in the variant shown a surfboard. Moreover, powered watercraft 100 includes a motion or position sensor device 30 including two longitudinally extended position sensors 32, 34 arranged on each side of body 10. Preferably, in the variant shown, the position sensors 32, 34 are arranged to extend over a lateral side area of body 10 where the paddling motion of the arms of surfer S using watercraft 100 is performed, to extend over a full or partial motion range covered by the brachium or upper arm of surfer S. In a variant, position sensor device 30 can be made of two battens or strips that integrate the position sensors 32, 34, driving and read-out electronics, and a wireless communication device to communicate with telecommunications controller 42 of controller 40, separately powered with its own battery, to provide for a modular and removable design of device 30.

Next, hand detection sensors 36, 38, for example pressure sensors, are arranged at each surface 14, 16 of body 10 about three-thirds up body 10 towards tip 11, configured to sense presence or a certain pressure when the hands of surfer S are grabbing these areas of body 10. In addition, as shown in FIG. 1C, water speed measurement sensor 37 is arranged on the lower surface 14 of body 10, and a water detection sensor 35 is also arranged on lower surface of body 10. Moreover, a controller 40 is arranged inside watercraft 100, operably connected to both position sensors 32, 34 and pressure sensors 36, 38, to receive signals from these sensors, wired or wirelessly via telecommunications controller 42. In this respect, controller 42 can act as a receiver to receive values from other sensors, or can be used to communicate with a configuration application of a smartphone. Controller 40 is also operably connected to water detection sensor 35 and water speed measurement sensor 37 arranged on lower surface 14 of body 10. Controller 40 is configured to capture signals from position sensors 32, 34 and pressure sensors 36, 38, water detection sensor 35 and speed measurement sensor 37, and to perform controls and data signal processing and analysis on signals from these sensors. Controller 40 can include, but is not limited to a microcontroller, signal processor, hardware processor, and additional periphery such as analog to digital converters, input and output ports, memory, or can also be made of analog electronics.

In addition, powered watercraft 100 further includes a propulsion system 60 having two pump jets or jet drives 62, 64 each having an impeller or other type of propulsion mechanism that are powered by motors 63, 65 via two drive shafts, respectively, jet drives 62, 64 arranged inside water ducts 82, 84, respectively. It is also possible that an external propeller be used instead of the impeller. In the variant shown, propulsion system 60 includes two jet drives 62, 64 and water ducts 82, 84 that arranged such that a rotational axis of the impeller of each jet drive 62, 64 is parallel to a longitudinal extension of the hull, a first jet drive 62 arranged in the left half of body 10, a second jet drive 64 arranged in the right half of body 10. In addition, to compensate for torque to body 10 when accelerating jet drives 62, 64, jet drives 62, 64 can be configured to rotate in opposite directions. Water ducts 82, 84 are in fluid communication with water body WB when watercraft is placed on WB, and lower surface 14 of body 10 includes two water inlet ports 87, 89 for impellers 62, 64, respectively, for receiving or entering water from water body WB, and two water egress ports 86, 88, for expulsing water that has traversed the respective impeller 62, 64, the water movement symbolized with arrows in FIG. 1B. With a rotating operation by motors 63, 65, impellers 62, 64 can be driven individually at a respective rotational speeds ω to provide for a second thrust $T_j$ when watercraft 100 is placed in a water body. However, it is also possible that impellers 62, 64 are operated by motors 63, 65 to turn in reverse, so that the inlet ports 87, 89 are used for water output, and the outlet egress or outlet ports 86, 88 are used for water input, in a reversed powering role.

FIG. 1C depicts body 10 from lower surface 14, showing the two water inlet ports 87, 89 covered by a grid or mesh for protection to prevent debris, water plants, and other particles from entering propulsion system 60, showing the two corresponding outlet ports 86, 88 also covered by a grid, water detection sensor 35, and water speed measurement sensor 37 arranged substantially in the middle of body 10, and three fins 12. In the variant shown, water ducts 82, 84 extend over a certain length, in a range between 10 cm to 100 cm, inside body 10. However, as it is preferable to keep a volume that is formed by water ducts 82, 84 as small as possible, as these ducts will be filled with water that add extra weight to watercraft 100, the water ducts 82, 84 are preferably kept short and of small diameter to reduce the volume of water inside. The low weight aspect and small thickness, preferably below 5 cm for the diameter of water ducts 82, 84 is a preferable design factor in case watercraft 100 is a surfboard. In FIGS. 1A to 1C, a distance along a longitudinal axis between ingress ports 87, 89 and egress or outlet ports 86, 88 is shown to be relatively long for illustration purposes, but are preferably much closer to each other.

Moreover, propulsion system 60 includes a power supply 70, for example including a battery 71 and a power filter 74, that provides for power to motors 63, 65, and a power electronic device 72, for example an electronic speed control (ESC) for each motor 63, 65 of jet drives 62, 64 with their impellers, to control the speed or other set value of electric motors 63, 65 for impellers of jet drives 62, 64 of propulsion system 60, such that an appropriate amount of electric power can delivered from power supply 70 to motors 63, 65. In a variant, instead of a speed control, a torque control can be used for power electronic device 72. Controller 40 is furthermore operably connected to power electronic device 72, so that the controller 40 can set the speed, torque, or other value for each motor 63, 65 to provide for a desired propulsive thrust to generate a forward or reverse propulsion of watercraft 100, hereinafter called the second thrust $T_j$. Moreover, a power filter 74 can be arranged between battery 71 and power electronic device 72 of power supply 70, or power filter 74 can be an integral part of power supply 70 or power electronic device 72. Power filter can be equipped with a short-term power storage, for example a supercapacitor or supercapacitor array, so that no short-term power demands need to be delivered from the battery 71 of power supply 70 to motors 62, 64, for example when propulsion system 60 is operated in a pulsating fashion to generate $T_j$, or during a short acceleration burst. Moreover, instead of pulsating the second thrust $T_j$ purely by a motor and impeller speed, it is also possible to vary second thrust $T_j$ by varying a impeller or propeller blade angle of a foldable or adjustable propeller/impeller, or by the use of a two or more water outlet ports each with an adjustable exit nozzle direction, to adjust a direction of the resulting water outlet flow, for example opposite and perpendicular to each other to achieve zero forward thrust, and in parallel with a longitudinal direction of watercraft 100 to achieve maximal forward thrust $T_j$.

As shown in FIG. 1D, where upper surface 16 of body 10 is shown, the watercraft 100 can be further equipped with a body presence sensor 31 operably connected to controller 40 that allows to detect presence of surfer S on upper surface 16 of watercraft 100. In the variant shown with watercraft 100, body presence sensor 31 can be made of a large surface pressure sensor array that allows to detect whether the surfer is lying on the watercraft 100, which is the case if the surfer is paddling, or whether the surfer is not in the lying position, which means the surfer either not on watercraft 100, or is standing on watercraft for surfing. For example, body presence sensor 31 can be a force sensitive resistor, or a capacitive presence sensor, configured to measure a surface pressure or dielectric capacity that corresponds to at least one of a chest and upper abdomen of the surfer lying on watercraft 100. Moreover, schematically, a cover 17 for power supply 70 is shown, so that battery 71 of power supply 70 can be removed from body 10 of watercraft 100 for recharging. Cover 17 is made to seal the body 10 and battery compartment in a waterproof manner. In another variant, instead or in combination with cover 17, a waterproof power plug can be arranged on body 10, for example on upper surface 16 of body 10, to connect a battery charger to battery 71. Moreover, the part of pressure sensors 36, 38 that are located on upper surface 16 of body 10 are shown, and a footpad 19 close to the tail end 13 of body 10.

Figure 2A:
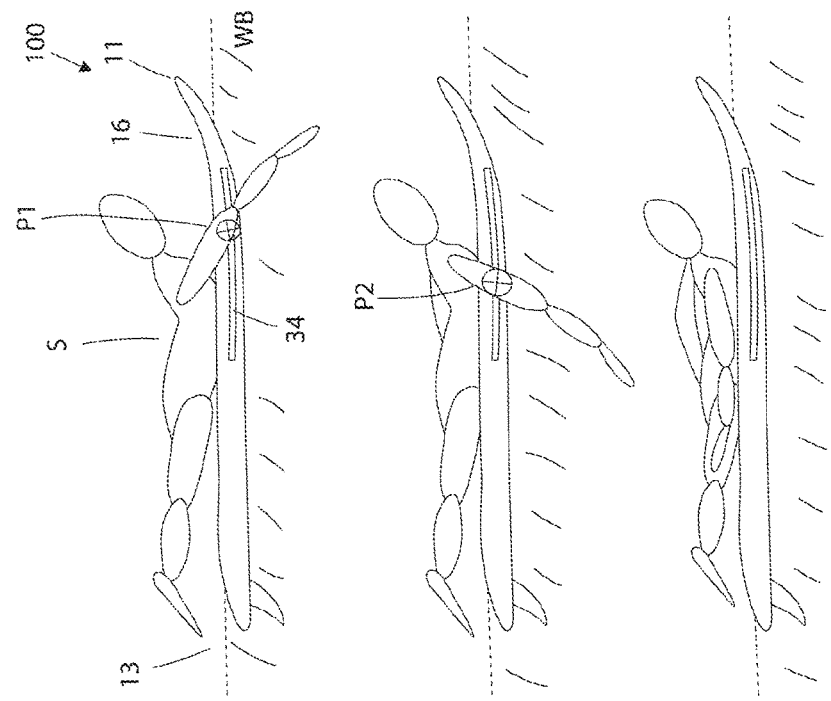
FIG. 2A shows stages of a paddling motion and FIG. 2B show graphs as a function of time for different measured and calculated signals to explain operation of watercraft 100.
Figure 2B:
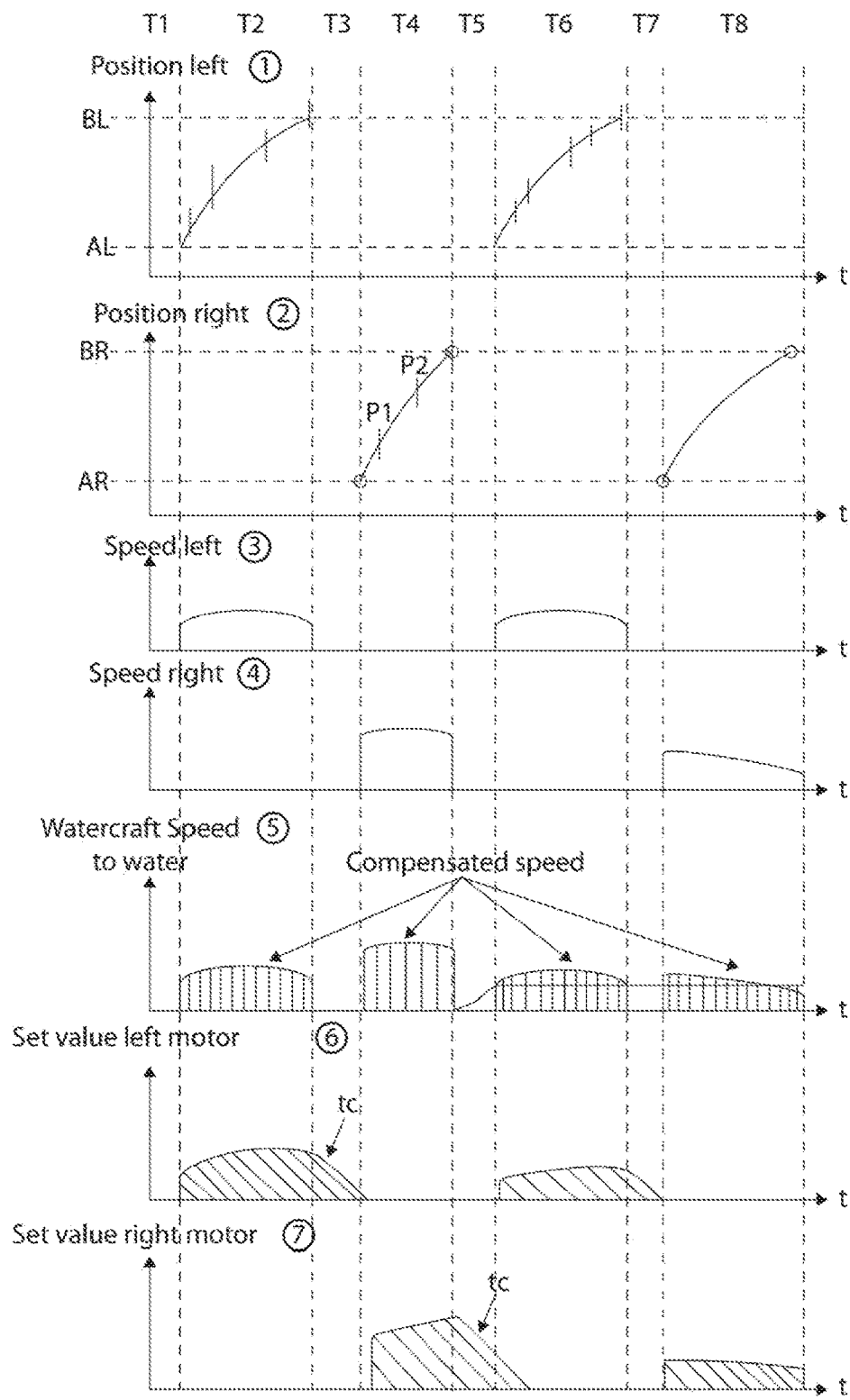

FIGS. 2A and 2B show graphs as a function of time showing different measured and calculated signals to explain operation and control of watercraft 100. With the propulsion system 60, controller 40, and position sensor device 30, it is possible to amplify or assist a fully manually-generated forward motion of watercraft 100 generated by the manual body motion or activity of a user with water body WB, the body motion resulting in the propulsing, pushing or otherwise moving water of the water body WB relative to watercraft, including body motions such as arm paddling, leg paddling, leg kicking, paddling or rowing with a paddle, oar, rudder, swimfin, arm or hand swim fins, leg pumping on a watercraft, hereinafter referred to as the first propulsive force or thrust $T_p$ with a second, additional propulsive force or second thrust $T_j$ generated by propulsion system 60, based on the measurement of a value indicative or representative of first thrust $T_p$. With manually-generated it is to be understood that $T_p$ is not generated by any powered propulsion system, for example using a motor, engine, turbine having a power source. This will subject watercraft to overall thrust $T_t$ that results from $T_p$ plus $T_j$. Propulsion system 60 is therefore a separate propulsion device from the body or device of user that causes $T_p$ by manual motion. In the variant shown, a speed of the paddling motion of surfer S relative to body 10 is used to measure a value indicative of the first thrust $T_p$, or a timely evolution of position of paddling motion. For example, as shown in FIG. 2A, a side view of a paddling surfer S is shown located on upper surface 16 of body 10 in a paddling position. Water line WL of water body WB is such that position sensor device 30 with sensors 32, 34 lie inside the water, i.e. underneath the water line WL. Position sensors 32 is configured to measure and provide for a signal of a position of the left arm of surfer S during the paddling motion at a given time instant, while position sensors 34 is configured to measure and provide for a signal of a position of the right arm of surfer S during the paddling motion at a given time instant, and to repeat these measurements at a regular sampling rate to track a movement of the left and right arm of surfer S during the paddling. This permits to calculate an instantaneous speed of the paddling motion at a given time.

In the upper representation of FIG. 2A, surfer S has initiated the natural paddling motion by diving his right front arm into the water body WB, and is providing for a forward motion of watercraft 100 relative to water body WB, by first thrust $T_p$. His upper arm is located at position P1 relative to body 10, or relative to position sensor 34 arranged on right side of body 10. Next, as shown in the middle representation of FIG. 2A, surfer S has further pulled his arm inside water body WB towards tail 13 of body 10, and his arm has moved to position P2 related to body 10 or position sensor 34, still providing for first thrust $T_p$ in the water to move watercraft 100 forward in water body WB. Next, in the lower representation of FIG. 2A, surfer S has moved his arm out of water body WB, and no forward thrust $T_p$ is generated anymore by his arm motion.

Next, as shown in FIG. 2B, a series of graphs are shown that illustrate the paddling motion by surfer (first two graphs from the top), the signals measured by the position sensor device 30 (graph three and four from top), a signal measured from water speed measurement sensor 37 and a calculated relative speed of the paddling motion of surfer S relative to water body WB (fifth graph) by controller 40, and signals generated by controller 40 to generate a value that is representative of the first thrust $T_p$ that is manually generated by surfer S, to generate a set value to operate jet drives 62, 64 of propulsion system 60, for example a set value that generates a second propulsive thrust $T_j$. This can be done by setting a corresponding speed value for jet drives 62, 64. All these graphs depict the different signals, values and calculations as a function of time, with time periods T1 to T8.

In the first graph, as seen from the top of FIG. 2B, a measured position of the left arm of surfer S from position sensor 32 during paddling motion is shown, showing a range of motion from AL to BL. Position sensor 32 arranged at the left side of body 10 and position sensor 34 arranged at the right side of body 10 and to measure the full motion range of various surfers, to cover different arm and body lengths. Time periods T2 and T6 correspond to the times where surfer S is pulling his left arm inside water body WB next to sensor 32, showing two paddling strokes performed by left arm. Next, in the second graph, a measured position of the right arm of surfer S from position sensor 34 during paddling motion is shown, showing a range of motion from AR to BR. This measured rowing motion corresponds to the rowing motion shown in FIG. 2A, with positions P1 and P2 of arm shown on the graph, at time period T4. As the paddling motion of left arm to right arm of a surfer is usually alternated, time periods T4 and T8 correspond to the time periods where surfer S is pulling his right arm in water body WB next to sensor 34, showing two paddling strokes performed by right arm. The paddling/rowing pulses or strokes are shown to be periodic. Time periods T1, T3, T5, and T7 correspond to periods where no paddling strokes are detected, an no first thrust $T_p$ is generated. These two measured position signals from positions sensors 32, 34, position left and position right, are transmitted and processed by controller 40.

As shown in third and fourth graphs, controller 40 calculates a resulting instantaneous paddling speed for both the left arm and the right arm of surfer S, a paddling speed relative to body 10 of watercraft 100. In the variant shown, in time period T4, the rowing motion of the right arm is faster than the rowing motion of left arm, as shown by time periods T2, T6 being longer than time period T4, and in time period T8, the rowing motion of right arm is slower than rowing motion of left arm. This results in different speeds of the arms relative to body 10 being calculated. Next, as shown in the fifth graph, controller 40 calculates compensated speeds, to determine a relative speed of paddling motion of the respective arms towards water body WB, based on a water speed measured by water speed measurement sensor 37 of watercraft 100. While a speed of watercraft 100 relative to water body WB is zero in time periods T1-T4, watercraft 100 picks up speed after two paddling strokes of surfer S, shown in the fifth graph at time periods T5-T8. A thrust generated by surfer S on watercraft 100 to provide for forward motion, the first thrust $T_p$, can be approximated by a paddling speed of his arms relative to the water body WB. However, the paddling speed relative to body 10 of watercraft is less representative of thrust generated for the forward motion. Therefore, controller 40 is configured to, based on a measured water speed relative to watercraft 100, calculate compensated speeds to obtain a more presentative power of the thrust generated by the paddling motion of surfer S.

As shown in the sixth and seventh graphs of FIG. 2B, a set value, for example a set speed or torque that is delivered as a signal to power electronic device 70 is shown, to provide for second thrust $T_j$ by jet drives 62, 64 via corresponding motors 63, 65. In a preferred embodiment, controller 40 is configured to calculate set values for motors 63, 65, such that the generated second thrust $T_j$ by propulsion system 60 is substantially proportional by a factor k to the first propulsive force $T_p$ generated by paddling motion of user. For example, this can be approximated by a set value for motors 63, 65 that is proportional to a compensated speed of the paddling motion of surfer S relative to water body WB. This will provide surfer S with full control over the motion of his watercraft by the mere paddling motion, but by increasing the overall thrust $T_t$ by adding second thrust $T_j$ with jet drives 62, 64 to the already existing manually generated thrust $T_p$ by his paddling motion. The result is a second thrust $T_j$ from propulsion system 60 that is in synchronization and substantially proportional to the first thrust $T_p$ generated by the paddling, and is also applied contemporarily. This can preserve a natural feeling of the paddling motion for surfing, as compared to solutions where jet drives are turned on and off by some remote device or switch. For example, the following equation can be used to calculated the desired speed ω or torque for motors 63, 65 that can be sent or instructed from controller 40 to power electronic device 72.

$$\text{set} = \sqrt{\left(\frac{\Delta p}{\Delta t} - s_w\right) \cdot k \cdot w(p) \cdot f(t)} \qquad (1)$$

In this equation (1), set is a set value for motors 63, 65, for example a rotational speed or torque set value, p is a position of either left or right arm relative to body 10, $\Delta p/\Delta t$ is a derivative of position p that results in speed $s_h$ of motion relative to body 10, $s_w$ is the speed of body 10 relative to water body WB, k is a constant proportional factor for normalization, for example to provide for an amplification or assistance of first thrust $T_p$ that results in a second thrust $T_j$ of propulsion system 60 that is proportional by a certain percentage to first thrust $T_p$, for example but not limited to an assistance factor of 20%, 50%, 100%, 150%, or more, w(p) is a weighting function that is determined based on position p of left or right arm relative to body 10, and f(t) is a filtering function, for example a band-pass or low-pass filter to remove noise or other captured position or motion signals from position sensor device 30 that are not part of paddling motion. In a simplified fashion, the square of the rotational speed ω is assumed to be proportional to the second thrust $T_p$ generated by propulsion system 60, the root is taken from the speed difference. However, instead of the root calculation to approximate the relation between speed difference and set value for propulsion system, a look-up table can be used that matched these values based on a series of experimentations and pre-stored in a memory of controller 40.

In this embodiment, a value of first thrust $T_p$ is indirectly measured by measuring a motion of paddling or rowing, for example by hands, arms, feet legs, or paddling device attached to arms or legs of from the user relative to body 10 of watercraft 100. The first thrust $T_p$ that is a consequence of the manual paddling or rowing is not measured directly. Thereafter, a second propulsive force $T_j$ is generated, calculated and set by controller 40 to be contemporary, substantially proportional and in synchronization to the first propulsive force, and as pulses that are in sync with the periodic manifestation of the first propulsive force of the paddling or rowing strokes of user. However, as discussed further herein, another value that is indicative of the first propulsive force or first thrust can be used, for example another value that is a direct consequence of the paddling or rowing, for example but not limited to a water flow rates generated by paddling or rowing, water flow rates in close proximity of a paddling or rowing device, or bending forces and strain on the paddling device, deformations and torques applied to paddling device while paddling or rowing, accelerations to the watercraft itself, motions of the paddling device relative to watercraft, acoustic or ultrasonic signals generated, sonar reflections, Doppler measurements, time-of-flight measurements, and image and video processing. As shown in FIG. 2B, the system, device and method can be used for any type of manual generation of first thrust $T_p$ that has a time-variable character, including at least one of a periodic, discontinuous, and intermittent character, or a variable amplitude or intensity. It can also be used for body boarders, divers, riverboarders, snorkelers, and swimmers that use the feet or legs for generating the first trust $T_p$.

According to one aspect, the second propulsive force $T_j$ that is generated by propulsion system 60 is preferably substantially in sync with first propulsive force $T_p$, and preferably with a small delay or phase angle between first thrust $T_p$ and $T_j$ by reducing a time delay between a start of the paddling/rowing stroke and the powering of propulsion system 60, based on the measurement of a value indicative of the first propulsive force. This requires a small latency for the data processing in controller 40. For the user, this assistive powering of propulsion device 60 will preserve the natural feeling of the paddling/rowing to high degree. The surfer S or user will feel as if he has increased strength, fitness, and endurance. When no first thrust $T_p$ is manually generated by user, there is no amplification by the second propulsive force.

In a variant, it is also possible to make the amplification factor to amplify first thrust $T_p$ to generate second thrust $T_j$ to be depending on the water speed relative to watercraft 100, and that above a certain water speed threshold, to stop amplifying the first thrust $T_p$. At relatively high water speeds relative to watercraft 100, for example above 3 m/s, it would be difficult for the user to still provide for a meaningful paddling or rowing stroke, to exceed the water speed. Therefore, it is possible to cut off the amplification above a certain threshold of water speed, and to make the amplification factor dependent on the water speed, for example to provide for a smaller amplification at higher water speeds.

Also, a direction of the second thrust $T_j$ that is generated by the propulsion device 60 can be made to be the same or substantially the same as the direction of the manually-generated first thrust $T_p$, for example selectively powering the two or more motors 63, 65 differently, or by using a single motor and impeller with a steerable nozzle or flap, that can be actuated by a rotary servo that can be controlled by controller 40, to provide for a directional second thrust $T_j$. Also, the direction of $T_j$ can be simply chosen to be constant in a direction of longitudinal extension of watercraft 100. As shown in the sixth and seventh graph of FIG. 2B, the left motor 63 can be controlled by a paddling motion by the left arm of surfer S, while the right motor 65 is controlled by a paddling motion by the right arm of surfer S, to give a directional feel. Motors 63, 65 are each controlled by their own ESC device, to generate selective amplification of first thrust $T_p$ of left and right arm of surfer S, to preserve a feeling of the surfer S of manual padding motion, including a momentum of watercraft 100 to turn inside water towards the left or right, by the corresponding left or right arm paddling.

Figure 2C:
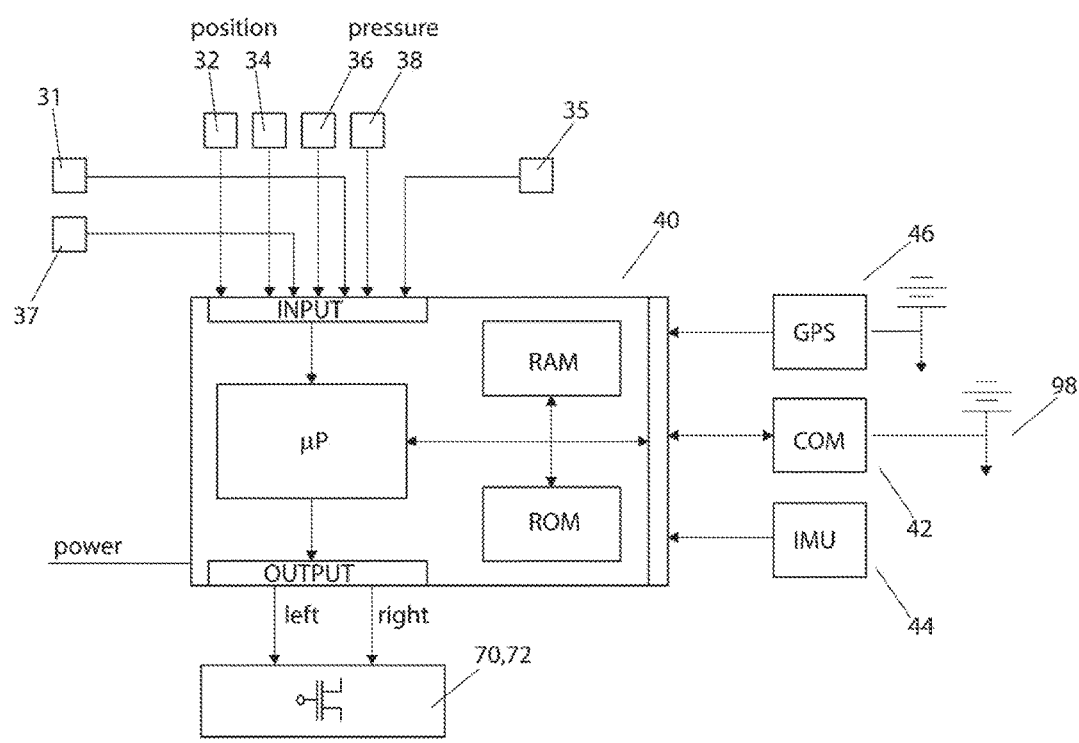
FIG. 2C shows an exemplary controller that can be used for controlling watercraft 100.

FIG. 2C shows a schematic representation of an exemplary controller 40 and the input and output signals, including a telecommunications interface 42 and an antenna 98 connected thereto, for example for wirelessly receiving values that are indicative of the first thrust $T_p$. Also, a global position system (GPS) received and antenna 46 and an accelerometer, for example an inertial measurement unit (IMU) 44 are operatively connected to controller, arranged in watercraft 100. Controller 40 includes a processor that can be programmed to calculate set values for motors 63, 65, for example speed values and torque values, or another type of set value for power electronic device 72 to control motors, for example separate values for controlling the electronic speed control of the left and right motor 63, 65 via an output. The input buffer, a device for receiving signals, of controller 40 can receive various measured signals, either directly or via a wired or wireless interface, by telecommunications interface 42 and an antenna 98, acting as a receiver. In the variant shown, the different sensors including body presence sensor 31, water detection sensor 35, water speed measurement sensor 37, left and right position sensors 32, 34, and left and right hand pressure sensors 36, 38 are operatively connected to controller 40 for delivering data. Correspondence and look-up tables for matching a set of input values, for example left position, right position, and water speed, to a set of output values for power electronic device 72 can be stored in the memory, for example in the RAM. Firmware and control software can be stored in the ROM. With such software being executed by processor, controller 40 can be configured to implement equation (1) or another type of calculation such that motors 63, 65 generate a second thrust $T_j$ that is based on a measurement of a value indicative of the first thrust $T_p$ generated by surfer S.

In a variant, it is also possible that only one set value signal is used to control both motors 63, 65, by combining the signals of sixth and seventh graph, so that no independent arm-specific thrust control is provided. In another variant, both motors 63, 65 can be controlled independently, but share common power in addition to the paddling motion of each arm. For example, each motor 63, 65 can be have a common set value calculated from the compensates speeds or other value indicate of first thrust $T_p$, but also have an independent set value for the left and right arm motion, respectively. Power electronic device 72 can therefore be simplified to provide for power for both motors 63, 65 together. In another variant, controller 40 calculates the set value for power electronic device 72 for providing thrust by jet drives 62, 64 based on a look-up table, or a formula, that takes into account not only the water speed from water speed sensor 37, but also other factors, for example a position of arm relative to body 10. For example, to provide for an improved sensation of acceleration with the right arm, it is possible that immediately upon detection of rowing motion at position sensor 34 for right arm of surfer S, the initial proportional factor k for generating second thrust $T_j$ is larger than at a later time instant of the same paddling motion, to provide for an adaptive value of proportionality k during a paddle stroke. For example, in time period T4, at position P1, the thrust generated can be make larger than the trust generated at position P2, although the compensated speed at P1 would be lower than at P2. Different look-up tables, calculations, and correspondence tables can be used for different weights of surfer S, or weight ranges, providing for stronger assistance for heavier surfers as compared to lighter ones.

For this, to generate the set values for motors, the set value can be multiplied by a weighting curve that depends on a position of arm relative to sensor 32, 34. This can be done that the initial stage of the paddling motion range, for example up to position P1 or P2, is stronger amplified, that the remaining portion. This weighting curve can also be calculated based on a preference of an individual surfer and his individual paddling stroke. For example, first thrust $T_p$ generated by a paddling stroke of an arm of a surfer can be characterized by measurements, as a function of the speed of watercraft 100 relative to water body (water speed), as a function of the position of arm relative to sensor 32, 34 and body 10, and as a function of a speed of arm relative to sensor 32, 34 and body 10. These values can be stored as a look-up table accessible by controller 40, or stored inside controller 40, to instantaneously calculate the desired motor speed to provide for a desired second thrust $T_j$. For example, controller 40 can use a correspondence or look-up table or calculates a required motor speed or torque for motors 63, 65 of propulsion system 60 for providing a second thrust $T_j$ that corresponds to first thrust $T_p$ provided by surfer S, but multiplied by a multiplication factor or assistance level. For example, the multiplication factor k can be preferably in a range between 0.25 to 4, to provide for 25% to 400% assistance of first thrust $T_p$ created by paddling motion of surfer S.

In a variant, it is also possible that at least one of position sensor device 30 and corresponding sensors 32, 34 include their own controller to calculate the speed of paddling motion, and to calculate the compensated speed of the arms relative to water body WB, and the speed of left arm and right arm are thereafter transmitted to controller 40. In another variant, upon placing body 10 of watercraft 100 on a water body WB, by measuring water presence on lower surface 14 of hull with water sensor 35, controller 40 can activate motors 63, 65 to provide for a low-value idle thrust, for example by detecting water with water detection sensor 35, combined with a signal from presence sensor 31, to provide for an idle water flow through ducts 82, 84. Also, if no water is detected by water detection sensor 35, the controller can deactivate any power supply to motors 63, 65. Similarly, when surfer S stands up on watercraft 100 to surf a wave, body presence sensor 31 would not detect surfer on upper surface 16 anymore, while water detection sensor 35 continues to detect water presence. At this moment, motors 63, 65 can be deactivated immediately, to avoid any interference with the surfing sensation on the wave.

In another variant, right after the paddling motion has been performed by the left arm or the right arm, it is possible to prevent the motors 63, 65 from being immediately deactivated, to provide for a slowly decreasing set value for motors 63, 65, for example based on a time constant $t_c$ that leads to a slow ramping down of the set value for motors 63, 65, starting from the last set value applied to each motor 63, 65, and decreasing constantly with time to eventually reach zero, or a non-zero value. This can reduce or eliminate jerks or sudden movements in the reverse direction to watercraft 100, when an end of a rowing/paddling stroke is reached. To take account of this effect, a trailing powering of each motor 63, 65 can be used, that is successively decreased. A rate of decrease by time constant $t_c$ can be made dependent on the overall weight of watercraft 100 with user, and on other factors can be taken into account, such as water currents and their strength and direction, for example when padding upstream of a river, and wind direction and strength, a period or frequency of the paddling/rowing, with a higher frequency requiring shorter time constant $t_c$.

Because of the pulsating nature of jet drives 62, 64 of propulsion system 60 that are activated with the rowing motion or paddling motion of a user, power from power supply 70 would have to be also provided in a pulsating fashion, with the paddling frequency that may be between a range between 0.2 and 2 Hz, or other ranges. To reduce strain on a live or operating cycle of battery 71 of power supply 70, a power filter 74 can be arranged between power supply 70 and power electronic device 72. For example, power filter 74 can be equipped with a supercapacitor or an array of supercapacitors that can provide for quick burst of power to motors 63, 65 without the need for taking power from the battery 71, thereby serving as a temporary power storage, configured to deliver large amounts of power for a short time period. This power storage can substantially improve battery life and battery capacity to lengthen operation of power supply 70 for use.

Controller 40 can also be configured to control an activation of motors 63, 65 to provide for propulsive force with jet engines 62, 64 by detecting signals from pressure sensors 36, 38. Sensors 36, 38 can also be implemented as another type of sensor, for example but not limited to a capacitive presence sensor, optical sensor, to detect presence of the hands of surfer S. Pressure sensors 36, 38 can be arranged at each side of the forward half of watercraft 100, at or close to a location where surfer S would grab body 10 for a duck dive, and can be arranged on either upper surface 16, lower surface 14, or inside body 10, or a combination thereof. Only when surfer S grabs side walls of watercraft 100 at a location of pressure sensors 36, 38 with his left and right hand, a pressure signal from both sensors 36, 38 can detected by controller 40, and controller 40 can in turn provide for a set value for both motors 63, 65 and jet engines 62, 64 to provide for continued thrust for propulsion watercraft in the forward direction, until the grip of at least one of the two hands is released. For example, a thrust by motors 63, 65 can be made proportional to a pressure force applied to either one or both sensors 36, 38. Also, the thrust $T_j$ can be made directional as a function of a which sensor 36, 38 is pressed stronger, for example a stronger pressure on sensor 36 resulting in a stronger thrust $T_j$ of left motor 63, and vice versa.

Two functions can be implemented by pressure sensors 36, 38. As a first function, for example in a case where body presence sensor 37 detects presence of surfer S on watercraft, and water sensor 35 detects watercraft 100 being on water body WB, in addition to the signal of pressure sensors 36, 38, this can be used to electrically power the surfer S and his watercraft out to a wave spot by propulsion system 60, without the need of any paddling motion at all. As a second function, for example in a case where presence sensor 37 does not detect presence of surfer S on watercraft, and water sensor 35 still detects watercraft 100 being on water body WB, in addition to the signal of pressure sensors 36, 38, this can be used to provide for a delayed boost, for example when performing a duck dive under a wave.

In this second function, upon detecting surfer S grabbing watercraft 100 at an area of sensors, and not detecting his presence on upper surface 16, a full boost of thrust for providing for example a few seconds of full power to motors 63, 65 can be performed, but only after a certain time delay, after several seconds. This can be used to strongly support duck diving under large waves, where surfer S cannot provide for any $T_p$ with his hands or arms. An additional sensor could be used that can detect full submersion of watercraft into water body WB, as an additional security feature.

Motors 63, 65 and a power supply 70 of watercraft 100 are preferably designed to solely assist or amplify a user of watercraft 100 in is natural propulsive movements to provide for increased and amplified body or hull speed, i.e. rowing or paddling, and generally will not provide for large power and propulsive forces to move watercraft into planing speeds without manual paddling or rowing. In the surfboard example, preferably the maximal propulsive force can be limited to a value below 75 N or 16.9 pound-force, preferably below 50 N or 11.2 pound-force. This is unlike some powered surfboards that have constantly powered jet drives at 400 N and more, to provide for planing speeds for the watercraft without manual support. In this respect, the weight of the additional components for the propulsion can be kept low so that the motion dynamics of watercraft 100, for example a surfboards performance on the wave while surfing, can be substantially preserved. In this respect, given the relative low power requirements, components from Remote Control (RC) water craft toys can be used, as these components are usually light-weight, readily available off the shelf, and low cost. Generally, when selecting jet driver, motor, and ducts, it is preferably to choose a smaller cross-sectional diameter of impeller, whilst increasing a rotational speed of impeller of jet drive. A non-limited example, two jet drives could be used, having an impeller diameter of 28 mm, operable up to close to 20,000 rpm, both together providing for up to 49 N of propulsive thrust. Similarly, a Li-Ion, Li—Po, or anode free Li-Metal battery back 71 for power supply 70 can be used, and standard ESC devices for power electronics device 72 can be used. Also, for motors 63, 65, preferably, DC brushless motors are used, with or without a water cooling element.

By selectively powering motors 63, 65 of propulsion system 60 with different set values, or by using a single motor with a steering element such as a directional output nozzle, it is possible to provide for a directional second thrust $T_j$ to move watercraft 100 forward. This feature can be used for surfers having different strengths and fitness in the left and right arm, for example due to an accident, injury, or age. Such directional thrust can be managed by controller 40 based on different settings, for example when watercraft 100 is used for rehabilitation purposes of an injury. In this variant, controller 40 can use different amplification factors for the left arm or right arm paddling strokes, so that total thrust $T_t$ on each side of watercraft 100 is the same. Also, a similar approach can be made for a surfer having only one arm for a one-sided paddling stroke, to compensate with direction thrust for the one-handed or one-armed paddling stroke.

Figure 3A:
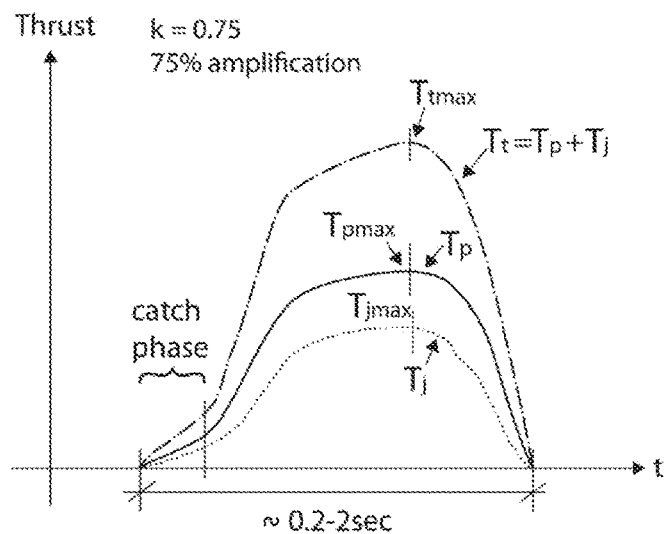
FIGS. 3A, 3B, and 3C show different methods of controlling the generated second thrust by controller, with FIG. 3A showing a proportional amplification, FIG. 3B showing a proportional amplification and preventing deceleration of watercraft above a certain threshold, and FIG. 3C showing a control of the second thrust such that the total thrust follows a predetermined curve.
Figure 3B:
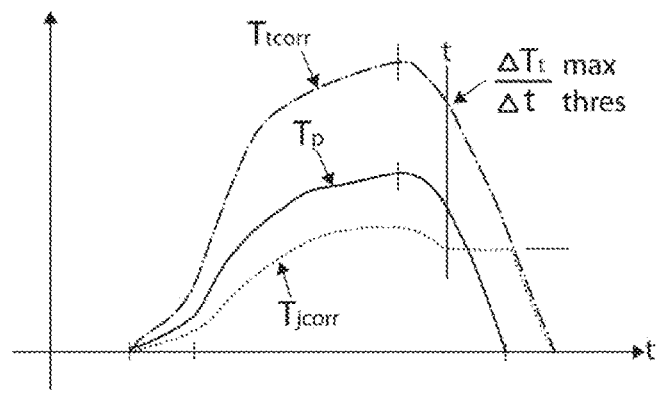
Figure 3C:
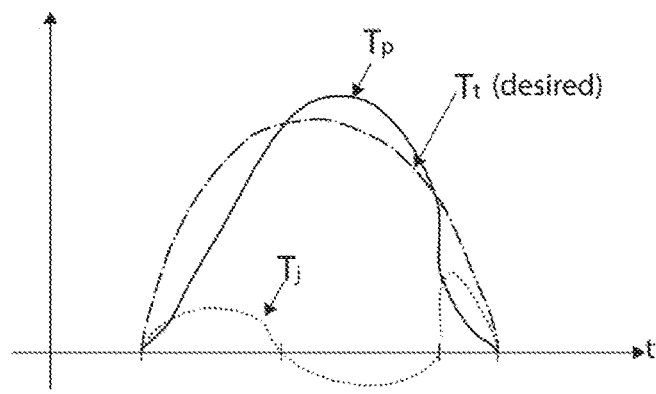

FIGS. 3A-3C show different curves representing different control strategies or methods to control watercraft 100 by controller 40, a solid line showing an actual value of first thrust $T_p$, a dotted line showing a second thrust $T_j$ generated by propulsion system 60, and a dash-dotted line showing the total thrust $T_t$ acting on watercraft 100. In FIG. 3A, a typical curve of the manually generated first thrust $T_p$ is shown, having a peak value at about 65% of the duty cycle of the paddling period. Simultaneously, second thrust $T_j$ is generated, being a proportional curve to $T_p$, by an amplification factor k=0.75, or 75%. The proportionality is shown to be constant over the entire paddling period, but it is also possible that a variable factor is used that varies over time, for example a weighing function. To preserve the natural feeling of the paddling by $T_p$, for example that a location on the timeline of the maxima are preserved, such that $T_{jmax}$ and $T_{tmax}$ are substantially at the same time instance, for example to be within the same time window having a length of 20% of a duration of the paddling period.

FIG. 3B shows a variant in which a change of total thrust $T_t$ is controlled to be limited to a maximal value, or a maximal permissible deceleration value of watercraft, in a direction opposite to the paddling direction. Increased water drag and/or wind drag can act on the amplified watercraft 100 and on user himself at higher speeds and winds, as compared to a drag caused during pure manual paddling/rowing. When first thrust $T_p$ is stopped, if the second thrust $T_j$ is merely proportional to $T_p$, the increased water and/or wind drag will create a sudden jerk or movement to watercraft 100, and could lead to user falling in the water or hitting his head. The resulting deceleration or resistance to watercraft 100 will feel unnatural, especially at higher amplification or assistance factors. Therefore, in this variant, a deceleration of watercraft 100 can be measured by an accelerometer 44, or the change of thrust $T_t$ can be calculated, to limit deceleration or change of thrust $T_t$ to a threshold value. Upon detecting a value that exceeds the threshold, typically in a later stage of the paddling period where a thrust portion $T_p$ of the user decreases below a certain value, second thrust $T_j$ can be controlled by controller 40 to limit the deceleration or change in total thrust $T_t$ to a constant value. For example, as soon as the threshold value is detected, second thrust $T_j$ is controlled such that the change of total thrust $T_t$ or deceleration remains constant, illustrated in FIG. 3B as a linear decrease. This control method provided for second thrust $T_j$ beyond an active period of paddling by the user to generate $T_p$.

FIG. 3C shows another method in which the second thrust $T_j$ is controlled such that the total thrust $T_t$ follows a predefined or calculated curve or profile, for example a curve that has been stored in the ROM of controller 40. For example, a predefined curve for $T_t$ could be a sinusoidal curve, or a paddling or rowing thrust curve of a sophisticated user. Thereby, second thrust $T_j$ can be generated to complement the first thrust $T_p$ generated by user. In the variant shown, to compensate for an undesired paddling or rowing thrust $T_p$ to match an ideal profile, the second thrust $T_j$ can also be negative.

In the FIGS. 3A to 3C, the curve for second thrust $T_j$ are shown in an idealized fashion without any signal lag or delay. However, it is possible that $T_j$ is somewhat delayed relative to $T_p$, due to signal measurement delay, processing sampling delays, and inertial delay for generating a desired thrust by propulsion system. Preferably, to improve the natural feeling of the paddling or rowing, the delay should be minimized, for example by using high measurement sampling rates and fast digital processing, and compensating the delay of the propulsion system.

Figure 4A:
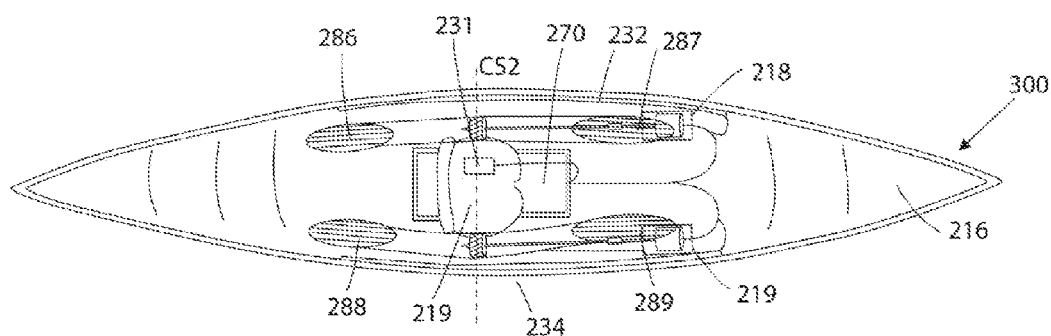
FIG. 4A showing a top view of an open hull 210 of watercraft 300, FIG. 4B showing a cross-sectional side view, FIG. 4C showing a side view, FIG. 4D showing a cross-sectional view along line CS2 shown in FIG. 4A, and FIG. 4E showing a paddle device 280 for operation with watercraft 300, watercraft 300 and paddle device 280 forming a watercraft system, according to still another embodiment.
Figure 4B:
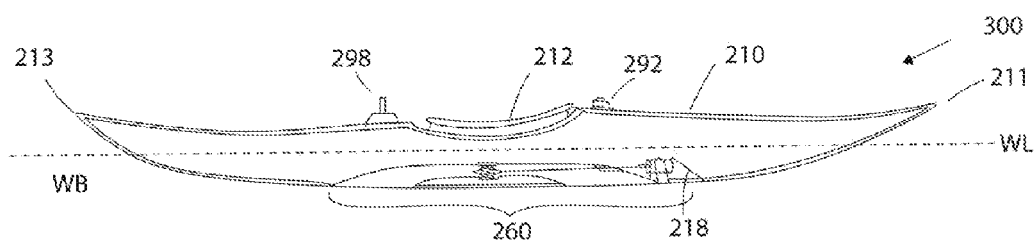
Figure 4C:
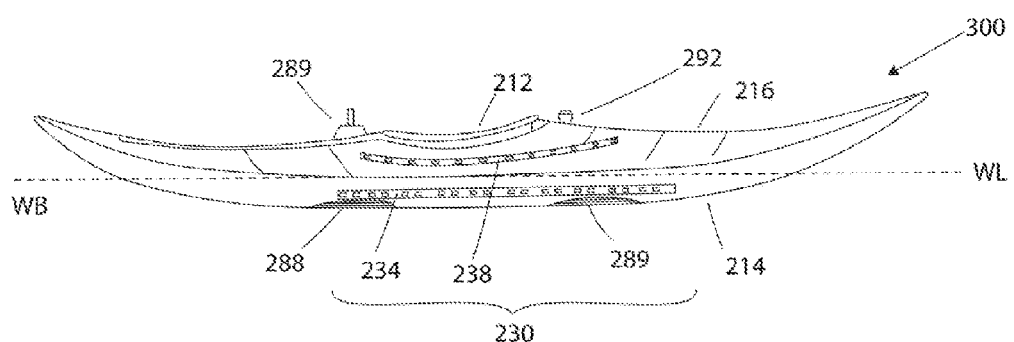
Figure 4D:
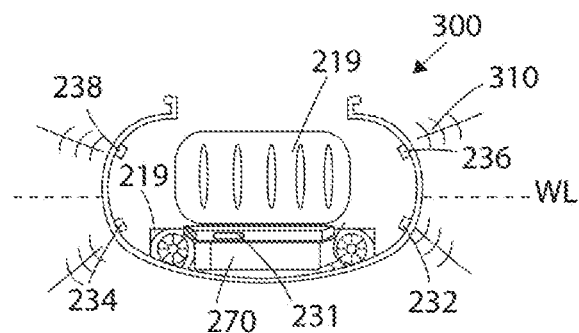
Figure 4E:
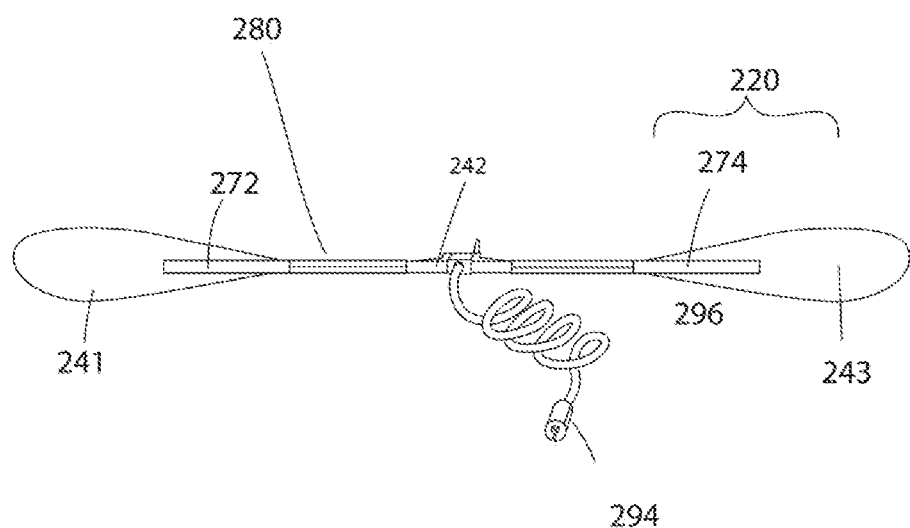

FIGS. 4A-4E show another embodiment of the present invention, in which watercraft 300 is a kayak, with FIG. 4A showing a top view with an open hull 210 for representative purposes, FIG. 4B showing a cross-sectional side view, FIG. 4C showing a side view with no cross-section, FIG. 4D showing a cross-sectional view along line CS2 shown in FIG. 4A, and FIG. 4E showing a paddling device 280, for example but not limited to a kayak paddle for operation with watercraft 300. In this embodiment, watercraft 300 is a traditional one-seater kayak that is equipped with propulsion system 260. Propulsion system 260 includes two water ducts arranged close to side walls and next to a seat 219 of watercraft 300, with water ingress ports 287 and 289, jet drives, and water egress ports 286, 288. A waterproof electronic control box 270 is construed as a flat box that is arranged underneath seat 219 and above lower hull 214, to provide for a low center of gravity, being the heaviest part of propulsion system 260. Electronic control box 270 can be removably installed in watercraft 300, and can include for example, but not limited to controller, power electronic devices for motors, batteries, power filters, connection cables to position sensor device 230. To determine a presence of kayaker or user in watercraft 300, a presence sensor 231 is installed, for example to detect or measure a weight of user or kayaker on seat 219, and is operably connected to electronic control box 270. Moreover, motors are arranged in waterproof casings 218, 219 that is attached to at least one of lower surface 214 of hull 210, or to water ducts in an area of water inlet ports 287, 289.

Position sensor device 230 includes, on each side of hull 210 of watercraft 300, a position sensor 232, 234 that is located below water line WL, and a position sensor 236, 238 that is arranged above water line WL. All positions sensors 232, 234, 236, 238 are operably connected to electronic control box 270. Moreover, on an upper surface 216 of hull 210, a waterproof connector 292 can be arranged centrally in a lateral direction of watercraft 300, and in close proximity to a paddling area of kayaker, in front of cockpit 212. Waterproof connector 292 can be wired to connect to electronic control box 270, with electronic control box having a wired data interface as a received for measured signals. Moreover, in a variant, a wireless communication port and antenna 298 are provided, permitting communication to a paddle 580 as shown in FIG. 7C, and wirelessly receiving data or to a smart phone, and can be provided on upper surface 216 of hull 210, the wireless communication controller operably connected to electronic control box 270.

Moreover, as shown in FIG. 4E, a paddling device 280 is shown, for example a kayak paddle, that is equipped with a cord 296 and a waterproof connector plug 294 to connect to watercraft 300 and electronic control box 270 via waterproof connector 292. Also, kayak paddle 280 is further equipped with signal controller device 242 inside shaft of kayak paddle 280, in a waterproof manner. Signal controller device 242 is operably connected to measurement device 220, including sensor 272, 274 that can measure a value indicative of a first thrust $T_p$ when paddling, for example force, bending or strain measurement sensors 272, 274 that are arranged on each blade of kayak paddle 280. For example, upon performing a paddling motion in water body WB, a faster paddling motion relative to water body WB will exert stronger forces and consequentially bending onto paddle, as compared to a slower paddling motion relative to water body WB that exerts a weaker force, and a signal indicative of this force can be measured by device 220. This measurement may not take into account a relative motion or position between paddle 280 and hull 210, or its motion. For example, hull 210 of watercraft 200 may be gliding through water body WB, and the paddler places a blade of paddle 280 in water body WB for breaking and turning hull 210. With this action, the paddler maintains the paddle at a fixed position relative to the side wall of hull 210, but a backwards thrust as $T_p$ is still created on blade of paddle 280. This force can be measured by force measurement device 220, and a signal indicative of the force can be transmitted to controller 240. In turn, such action by paddler can be assisted or amplified with propulsion system 260. For example, a set value for a rotational speed or torque for motors of propulsion system 260 can be calculated based on the measured bending force. The set value for the rotational speed of motors of propulsion system 260 to generate the second thrust $T_j$ can be proportional to the root of the measured bending force, as the measured bending force will be substantially proportional to the first thrust $T_p$. This measurement principle may also be used in embodiments such as sports rowing boats or crew boats, where the paddle or oar blade is far removed from the body of hull 210 of watercraft 200. In this variant, it is possible to measure force applied to the oar at the oarlock that is attached to the end of outriggers, for example by measuring a mechanical deformation of the oarlock with force measurement device 220.

In the variant shown, force measurement sensors 272, 274 can be made of a pair of strain gauges in the form of longitudinal strips that are arranged on at least partially on a front side and a rear side of blades 241, 243 of paddle 280. In addition, paddle 280 is equipped with signal controller device 242 including measurement electronics, a power supply, and a communication device for communicating a signal indicative of the force measurement to the electronic control box 270, for example in a wired fashion via cord 296 and connectors 294, 292, or in variant wirelessly via wireless communication port and antenna 298. In a variant, the blades 241, 243 of paddle 280 can be further equipped with a water detection sensor to detect the presence of water around the blades 241, 243, to activate the propulsions system 260 and avoid false signals. In the variant shown, force measurement sensors 272, 274 are arranged to cover a part of blade and shaft, as the bending forces during paddling motion in water are expected to be the strongest at the transition from paddle blade to paddle shaft. In a variant, paddle 280 can be equipped with strain gauges that are arranged along a shaft of the paddle 290, or on the paddle blades 241, 243 only. Strain gauges itself are connected to a quarter bridge strain gauge circuit for measurements, with a strain gauge located on each side of paddle, as shown in FIG. 4E, only one side is shown. A signal from sensors 272, 274 can provide for an indication of force and a direction of the force that is applied to the paddle 290 when a paddler or kayaker is paddling. This allows to directly measure an effort by a kayaker with his paddle 290, without the need of detecting at least one of a position and a speed of the paddle 290 in a paddling motion.

For purposes of this description, a paddling device 280 can be understood as being different types of devices that assist or aid a user in manually providing for a first thrust $T_p$ to his watercraft when placed on a water body WB, when moving paddling device in a paddling or rowing motion by either legs, arms, or body of user inside water body WB, for example but not limited to a kayak paddle, raft paddle, canoe paddle, SUP paddle, oar, swimfins for legs, surfing paddle gloves, hand paddles, paddling blades, wrist protector. Other than bending measurement, paddling device 280 can be equipped with different types of sensors that can measure a value indicative of a first thrust $T_p$ or propulsive force generated by user with manual motion, for example a water flow rate measurement sensor at paddling device 280, position sensors, torque sensors, water speed measurements sensors, water or air pressure measurement sensors.

To generate a second forward thrust $T_j$ for moving watercraft 300 forward, in addition to a first propulsive force or first thrust $T_p$ generated by the manual paddling motion of kayaker with paddle 290, motors of propulsion system 260 can be controlled by electronic control box 270 in a similar manner as described above with respect to watercraft 100, but based on a force that is applied to paddle 290, for example only whilst one of blades 241, 243 is in the water body WB due to the paddling motion of kayaker. A left paddle stroke of kayaker can provide for a measured force by bending on left blade 241, that is then calculated in a set value for left motor of propulsion system 260, and the right motor can be controlled analogously by a force applied to right blade 242 of paddle 280. An increased bending force that is measured is indicative of increased propulsion of watercraft 300 by paddler. Therefore, the measured bending force is somewhat proportional to the propulsive force generated by kayaker. For example, the following equation can be used to calculated the desired rotational speed w or torque for motors of propulsion system 260 that can be sent from controller 240 to power electronic device for controlling motors.

$$\mathit{set} = \sqrt{f} \cdot k \cdot w(t) \cdot f(t) \quad (2)$$

In this equation (2) that is simpler than equation (1), s is a set value for motors of propulsion system 260, for example a rotational speed or torque set value, f is a bending force measured, k is a constant proportional factor for normalization and weighting, for example to provide for an amplification or assistance of first thrust $T_p$ that results in a second thrust $T_j$ that is proportional by a certain percentage to first thrust $T_p$, for example but not limited to an assistance factor of 20%, 50%, 100%, 150%, or more, w(t) is a weighting function or look-up table value that is determined based a time t, for example to transform a typical timely evolution of the bending force into a corresponding value for motor speed or torque, and f(t) is a filtering function, for example a band pass filter to remove noise or other erroneously captured signals. The root of the bending force f is used because, in a simplified fashion, it can be said that the square of the rotational speed w of propulsion system 260 is proportional to the thrust $T_j$ generated by system 260. In case the kayaker engages in reverse paddling, a negative force can be measured, so that an impeller or propeller of jet drive of propulsion system 260 can turn in reverse to amplify or assist the reverse paddling, or braking.

As shown in FIGS. 4C and 4D, watercraft 300 is also equipped with two pairs of position sensors, a position sensor pair 232, 234 below water line WL, and a position sensor pair 236, 238 above water line WL. Position sensors 232, 234, 236, 238 are arranged to measure a full range of motion of the paddling motion of kayaker, to measure a position of paddle, either the left side of paddle or the right side of paddle, at a given time instant. These measurements can be repeated at a given sampling rate, to make sufficient measurements to track a motion of paddle 290. This allows to calculate an instantaneous speed of each paddle blade 241, 243 in the water body WB. These measurements can be used as shown above with watercraft 100, to generate a thrust with propulsion system 260 that is indicative of a speed difference between the average paddling speed during a paddling stroke, and a speed of hull 210 relative to water. Position sensors 232, 234, 236, 238 can be used in addition or without the force measurement sensors 272, 274, to control thrust of propulsion system. If sensors are used in combination, it is possible to provide for a redundant measurement system to avoid or reduce problems with erroneous measurements.

Figure 5:
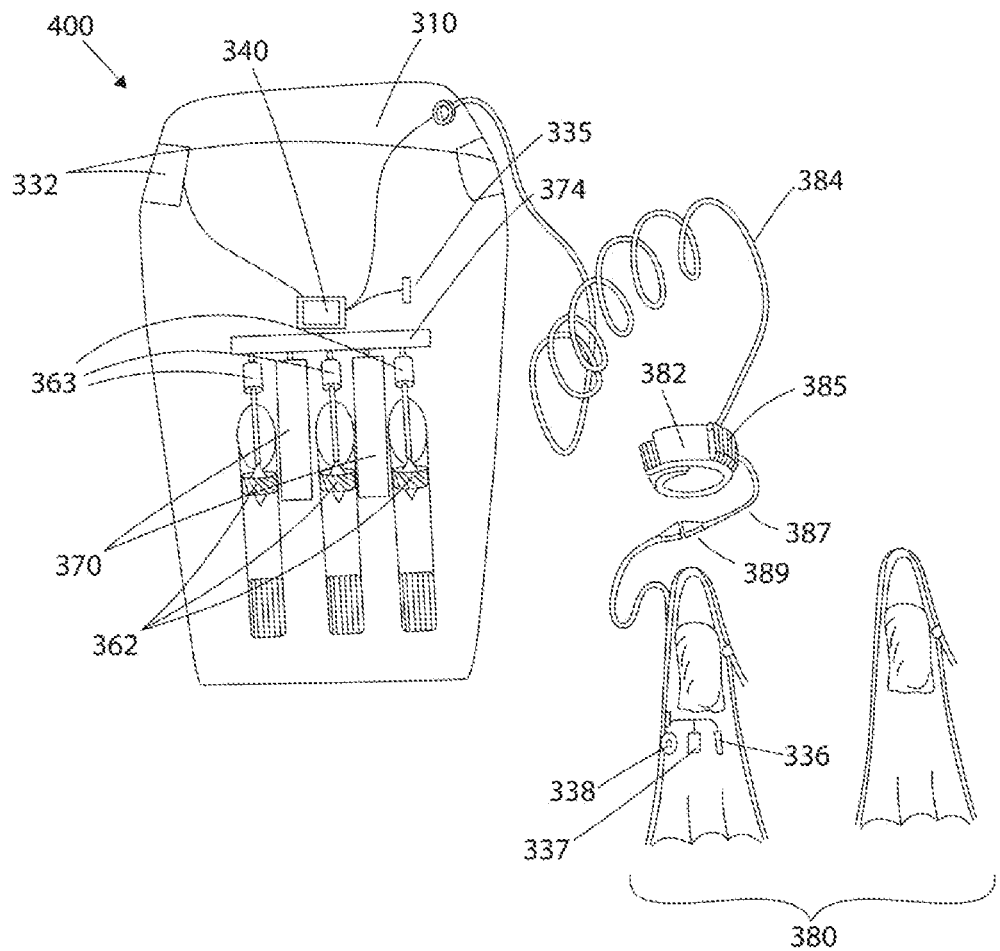
FIG. 5 shows a perspective view of watercraft 400 made in the form of a body board and swimfins 380, watercraft 400 and swimfin 380 forming a watercraft system, according to yet another embodiment.

FIG. 5 shows another embodiment, where watercraft 400 is made in the form of a body board or propulsion device that is generally used together with swim finds, for example diving or snorkeling equipment. As a body boarder provides for first thrust $T_p$ to watercraft 400 or his own body by foot paddling with swimfins 380, a second thrust $T_j$ generated by the body boarder based on a measurement of a sensor that is attached to swimfins 380, for example by a flow rate meter 338, an accelerometer 337, a force measurement sensor to measure strain or bending, or a combination of these measurements. In addition, a water presence sensor 336 can be arranged on swimfin 380. These sensors are operatively connected to a controller and communication device 385, via a communication link formed by cable 387 and connector 389. Only one swimfin is shown to be equipped with sensors 336, 337, 338, but it is also possible that both swimfins 380 have such sensors. Controller 385, and any battery that powers controller 385 can be attached to a wrist or ankle strap 382. Controller 385 is also in communication with controller 340 of watercraft 400, via leash 384. Leash 384 to watercraft 400 can therefore serve two purposes, to provide for the conventional secure link between body boarder and watercraft 400, but can also serve as a communication link to communicate data from controller 385 from sensors 338, 337, 336 to controller 340 of watercraft 400. In a variant, wireless communications through water body WB is used. Controller 340 is configured to calculate a set value for motors 363, in the variant shown, three motors 363 with corresponding impellers 362, to provide for second thrust $T_j$ that depends from first thrust $T_p$ generated by body boarder with his feet paddling via swimfins 380. By using three or more motors 363 for the propulsions system 360, a diameter of impellers or ducts can be further reduced to fit into a relatively thin body board. Two battery packs 370 are arranged between water ducts of motors 363 that can provide for cooling. Moreover, watercraft 400 can also be equipped with a pair of pressure sensors 332 to detect a firm grip of both hands of body boarder, that can activate motors 363 to electrically power watercraft 400 without manual paddling, as discussed with respect to sensors 36, 38.

Unlike paddling with an arm of the user directly or via a paddling device, usually, when foot paddling, the feet and legs of the user, and the swim fins 380 are always in the water during a generation of first thrust $T_p$. Also, the motion of both legs or feet is performed in parallel along a timeline, both performing a constant reciprocating up and down movement, resulting in a first thrust $T_p$ having a first constant part, and second oscillating part. Due to the reciprocating movement, higher $T_p$ are at least partially generated by a higher frequency of foot paddling, and the movements of feet and the resulting $T_p$ can be measured and represented by an acceleration perpendicular to a surface formed by the swim fins 380 by sensor 337. Based on this timely evolution of the acceleration, a value for second thrust $T_j$ generated by propulsion system 360 can be calculated by controller 340, such that a total thrust $T_t$ is substantially in sync and proportionally amplified based on the first thrust $T_j$.

In a variant, only when water is detected with water presence sensor 336, for example when swimfins 380 are in the water body WB, the value indicative of first thrust $T_p$ can be based on bending or water flow measured from sensor 338 resulting in higher propulsive force provided by body boarder. Consequently, controller 340 can calculate a higher assisting propulsive thrust delivered by motors 363 as a function of increased values from sensor 338. This correspondence can be assisted by a pre-calculated look-up table.

In variant, as indicated above, instead of being formed as a body board, watercraft 400 can be made as a propulsion device for a diver, for example a body attached to the buoyancy compensator jacket to the front chest part or the back of diver, the wetsuit itself, for example as shown in U.S. Pat. No. 3,995,578, between the tank and the buoyancy compensator jacket, as a belt that can be attached to body, or as a separate device that the diver can hold on to with handles, as a diver propulsion device (DPV). In another variant, watercraft 400 can be made as an underwater jetpack, or other types of personal underwater propulsion devices, for snorkelers, divers, scuba professionals, and underwater and surface water swimmers, for example as shown in U.S. Pat. No. 6,823,813 or 9,327,165 or a leg or back-mounted variant, to provide for an assistive second thrust $T_j$. Also, for these devices, a first thrust $T_p$ is generated by the diver with foot paddling of swimfins 380, or alternatively by arm motion, and the second thrust $T_j$ is generated to be substantially proportional, substantially co-temporal to first thrust $T_p$.

Figure 6:
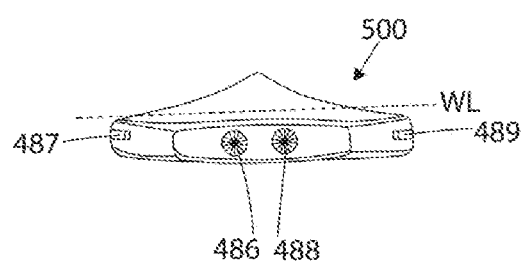
FIG. 6 shows a rear view of a watercraft 500 with water inlets and outlets that are not located on a lower surface of watercraft 500, according to another embodiment.

FIG. 6 shows rear view of a variant of watercraft 500 is that none of the water ingress ports 487, 489 and water egress ports are arranged on bottom surface 414 of hull or body 410, such that bottom surface 414 is not obstructed for better wave surfing experience. For this purpose, water ingress ports 487, 489 are arranged on side walls or rails of watercraft 500, but still located under water line WL when surfer S is on top of upper surface 416 of hull 410. Also, water ingress ports 487, 489 are located at the rear half of hull 410, to preferably be outside of the full motional range of arms of a paddling surfer S. Similarly, water egress ports 486, 488 are arranged on a rear end surface 413 of hull 410, also under water line WL.

With increased rotational speeds for motors 465, 467, a diameter of impeller can be reduced to a size of around 25 mm, to operate motors at rotational speeds at or above 20,000 rpm. This strongly reduced overall weight, but can generate acoustic waves inside water body WB as a shark deterrent. In a variant, instead of using two motors, four or more motors can be used further reducing a required diameter for the impellers or propellers.

Figure 7A:
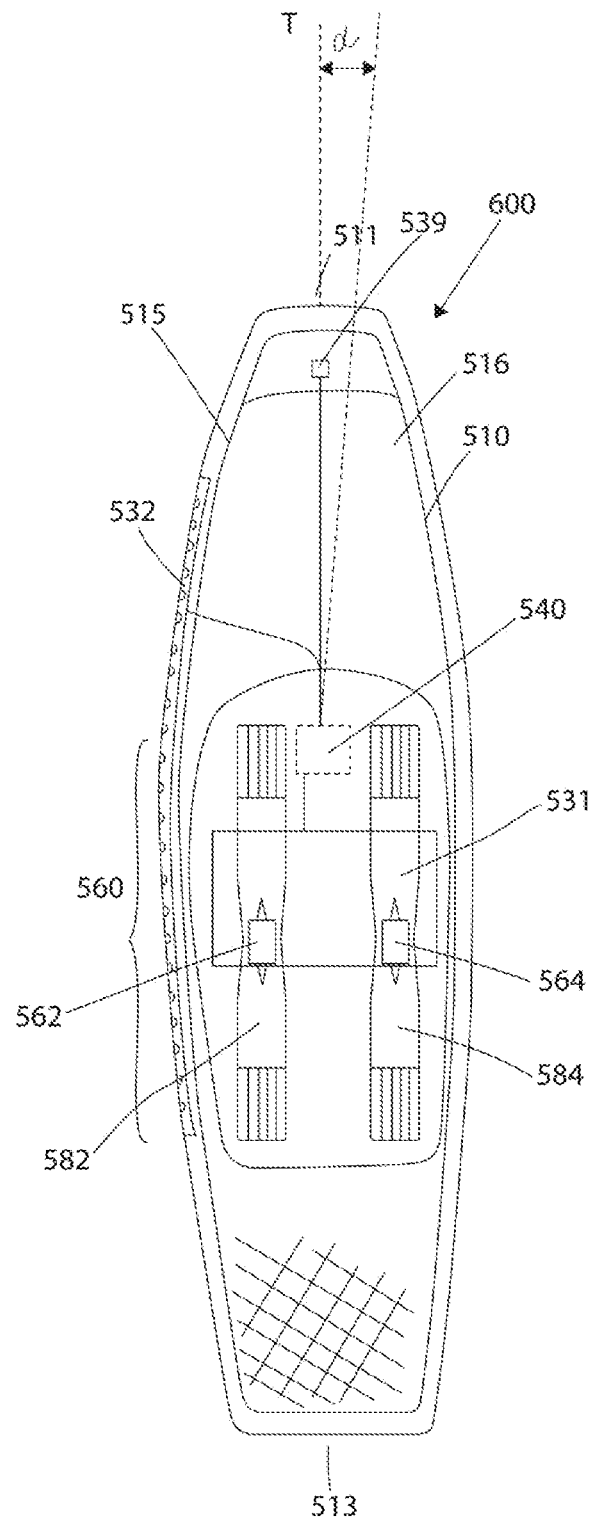
FIG. 7A shows a top exposed view watercraft 600 in form of a SUP board.

FIG. 7A shows a top exposed view of another embodiment of the present invention, in which a watercraft 600 is made in the shape of a SUP board, or another watercraft that is preferentially paddled on only one side, for example but not limited to a raft, canoe, C1 kayak, and FIG. 7B shows an exemplary paddle 580 to be used with watercraft 600. Paddle 580 together with watercraft 600 form an SUP paddling system. Due to the one-sided paddling, position detection sensor 532 can be arranged only on one side of hull 510, in the variant shown on the left side. A feature of this embodiment is the provision of an absolute orientation sensor 539, for example a sensor including a gyroscope, an accelerometer, and a magnetometer, or position data from a GPS receiver 46 (FIG. 2C) that allows to measure changes from an angular orientation of watercraft 600 relative to water body WB. Sensor 539 is connected to controller 540 to generate a directional propulsive force with propulsion system 560 to compensate for single sided rowing or paddling by user, by selectively powering motors of propulsion system. This allows to maintain a trajectory T of a forward movement of watercraft 600, if due to the one-sided paddling, watercraft has moved off trajectory T by an angle α. For example, while a common set value is provided for both left and right motors 562, 564 of channels or ducts 582, 584, a difference between set signal for the left 562 motor and the set signal of the right motor 564 is based on an error signal calculated by controller 540, when a measured absolute orientation from sensor 539 differs from desired orientation given by trajectory T, to reduce angle α to zero.

Moreover, a memory operatively associated with controller 540 can pre-store a GPS coordinate track, having a desired route that a user may want to follow. In this variant, controller 540 can be configured to control propulsion system 560 such that watercraft 600 pursues two goals or objectives. In a first step, the first thrust $T_p$ of user is amplified by second thrust $T_j$ to create a total thrust $T_t$ substantially proportional and in sync with first thrust $T_p$, but only having a forward component with no directional propulsion. Simultaneously, in a second step, and jet drives, rudder, or directional nozzle of propulsion system 560 can be selectively controlled such that upon paddling or rowing by user, a trajectory of watercraft 600 will be controlled to follow the GPS coordinate track, based on an actual position of received from GPS receiver 539, with a directional component of thrust to $T_p$. In the variant shown, upon generating $T_j$, the first and second motor 562, 564 can have a difference in generated thrust that provides for a steering of watercraft 600 to control a position of watercraft 600 to the GPS coordinate track. The two partial thrusts of the left and right motor add up to generate $T_j$ only when the user is paddling, thereby the control and automatic guiding of watercraft 600 to the pre-stored track is not intrusive to the natural paddling. In other words, any directional component of propulsion system 560 to move watercraft 600 in a different direction than the forward direction, either by a difference in powering the motors, or by a steering system such as a rudder or a steerable nozzle, can be based on a difference between a present position of watercraft 600 and a desired position, for example a position along a coordinate track.

Another feature of this variant is that at least one of an upper surface 516 and/or lower surface of watercraft 600 is covered substantially with solar panel 515, for example to cover at least 80% of upper surface 516. Given the length and width of standard SUP boards, a solar panel surface of over one (1) square meter can be provided. On sunny days, solar panel 515 can be used to provide for additional power to motors of propulsion system 560, or can be the sole power source of watercraft 600. For example, with the latest solar panel technology, a power of 200 W, 500 W, and more can be provided, solely by solar power. This power generated by solar panel 515 can be either used to charge battery pack via a battery charger, or can be used to provide power to a temporary power storage, for example a capacitor or a supercapacitor array. In turn, this power can be used for powering propulsion system 560 and for powering controller 540 and sensor 532, for example only via the temporary power storage without providing a battery. This solution can provide for a fully sustainable powering solution with no need of battery and battery charging.

In a variant, propulsion system 560 is the use as a back-up powering device for watercrafts in case of emergency or rescue. Due to the light-weight and compact nature of propulsion system 560, it is possible to equip watercrafts with the system without substantially interfering with the weight or design of the watercraft. This is particularly interesting if the watercraft is further equipped with solar panels 515 to support a power supply. For example, watercraft 600 could be sea kayak that is equipped with such system, minimally interfering with the manual paddling motion of the sea kayak, and the upper surface of the hull 510 of sea kayak could be substantially covered with solar panels 515 to provide for energy to battery back via a charger, and/or directly to propulsions system 560 via a temporary storage. Also, for this purpose, as propulsions system 560 is only used for emergencies or in case of need, water ingress ports and water egress ports and the water channels or ducts can be sealed off from water body WB by waterproof caps or plugs, see the example shown in FIGS. 13A-13D, to keep water outside of water channels or ducts of propulsion system 560.

FIG. 7B shows exemplary paddles 580 to be used with watercraft 600. Paddle 580 shown on the left side is equipped with an additional passive device 572 that improves the measurement of a position of paddle 580 with position sensor 532 relative to hull 510 when performing the paddling motion, for example a high dielectric constant material in the case an array of capacitive sensors are used for sensor 532, a permanent magnet in the case an array of hall effect sensor is used for sensor 532, a material with high magnetic permeability, for example a ferrite in case an array of inductive sensors are used for sensor 532. In a variant, passive device 572 is an optically reflective material that can reflect light emitted from sensor 532, in a case where sensor 532 is made of an array of photodiodes and light emitting diodes, the optically reflective material reflecting the LED light back to the photodiodes for detection. In a variant, passive device 572 can be a coating that improves reflection of acoustic signals in case an array of sonar sensors or acoustic transducers are used for sensor 532.

Moreover, paddle 580 shown on the right includes an active device 574 for improving the measurement of position of paddle 580 relative to hull 510 with sensor 532. For example, active device can be an array of light emitting diodes (LED) and associated lenses, that can emit light, in a case where sensor 532 is implemented as an array of photodiodes. For example, blue LED can be used with a wavelength of 400 nm to 490 nm to avoid or minimize absorption of the LED light by water body WB. Also, invisible near-infrared (NIR) LED lights could be used. A battery 576 can be arranged inside shaft of paddle 580 to power the lights. Also, in a variant, active device 574 can be an acoustic transducer, in a case where sensor 532 is an acoustic signal sensor. In a variant, sensor 532 and paddle 580 can be equipped by a combination of the above elements, to provide for a more reliable and redundant measurement. Also, other paddling devices can also be equipped with the same or similar elements for measurement of a paddling or rowing movement of a user, for example but not limited to the sleeve of a wetsuit, shaft of an oar, paddling gloves, paddling blades, wrist guard, upper arm sleeve, rash guard.

FIG. 7C shows an embodiment where paddle, rudder, or oar 580 is equipped a measurement device 530 having a pair of strain gauges 272, 274, for example to retrofit an existing paddle. Strain gauges 272, 274 that are mounted to a frame 587 that is press-fitted to an upper part of paddle shaft 582 that extends to the handle of paddle 580, and a lower part of paddle shaft 581 that extends to the paddle blade, preferably with cylindrically-shaped elements that can press-fit into inner cylinders of shaft elements 581, 582. Frame 287 of measurement device 530 is configured to bend between upper and lower shaft elements 581, 582. An insert element 589 can be arranged between paddle shaft elements 581, 582, to add or remove stiffness to the measurement device 530, depending on strength and preference of paddler. Strain gauges 272, 274 are operatively connected to signal electronics and a controller 242 to pre-process the signals and perform analog-to-digital conversion, and a communication controller 243 with an antenna 245 for wireless communication is operatively connected to controller 242. This allows to wirelessly communicate to controller of watercraft, for example to controller 40 via telecom controller 42 and antenna 98. Data including a value indicative of the measured bending or strain of paddle 580 can be sent via controller 243 and antenna 245 to controller of the watercraft. In a variant, instead of using strain gauges 272, 274, it is possible to use piezo-based bending measurement devices, optical fibers with a grating, laser diode projection to an image sensor to measure small displacement between shaft elements 581, 582. Also, a battery 271 is provided to power measurement device 530. Moreover, a water presence sensor 230 is arranged operatively connected to controller 242, such that a signal can be sent to controller of watercraft allowing to block or disallow a generation of second thrust $T_j$ if the bending is not caused by water on blade or proximity of blade of paddle 580.

Figure 8A:
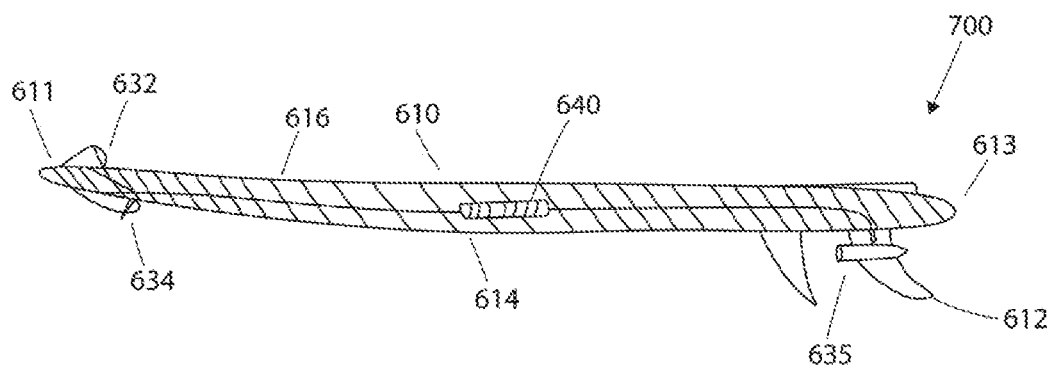
FIG. 8A shows a side view of watercraft 700 including one or more cameras 632, 634, 635, and FIG. 8B schematically showing exemplarily different views from cameras 632, 634, 635, for detecting manual paddling or rowing, according to still another embodiment.
Figure 8B:
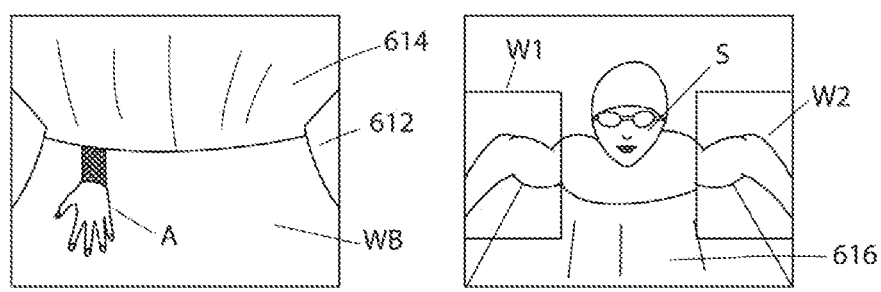

FIG. 8A shows another embodiment in which a watercraft 700 is equipped with one or more cameras 632, 634, 635 or other types of image capturing devices to capture a paddling or rowing motion of user from a sequence of images by image processing, and FIG. 8B schematically showing exemplarily views from cameras 632, 634, 635 equipped with a waterproof casing. Instead of using position detection device 30, force measurement device 220, or the other means described herein to detect a value indicative of first thrust $T_p$, it is also possible to use image sequences captured by a camera, and apply image processing algorithms to detect and analyze motion by a paddling device or arm of surfer S, for example to detect frequency, active time period, and speed of the rowing or paddling motion. In the variant shown, a camera 632 can be placed on tip 611 of hull 610 on upper surface 616 of watercraft 700. This allows to capture and analyze surfing motions of surfer S, by detecting arms in areas of interest W1, W2, as shown in the middle of FIG. 8B, and a frequency of the motion. Cameras 632, 634, 635 can be so called smart cameras that are equipped with an image processing processor to process the areas of interest W1, W2 to detect and provide for a signal representative of the first thrust $T_p$ that is then transmitted to controller 640 of watercraft 700. For example, motion tracking, feature detection, feature extraction, spectral analysis and other types of image processing can be performed at cameras 632, 634, 635 for this purpose, to detect a value indicative of the first thrust $T_p$.

In a variant, the view of camera does not have to be on top 616 of hull 610 of watercraft 700, but can be an underwater view, for example from the rear of the watercraft towards the front, for example with camera 635 attached to fin 612 that provides for an image as exemplarily shown in FIG. 8B on top, or from tip 611 of the watercraft 700 towards the rear that provides for an image as exemplarily shown in FIG. 8B on the bottom. The underwater view of cameras 632, 635 can provide for advantages when processing the image sequences captured by camera 632, 635, as the background provided by the water body WB can be more uniform, and this can facilitate the motion detection of the rowing or padding. Also, in the case of kayaks, canoes, and SUP boards as watercrafts, a field of view of a camera mounted on the upper side of hull can easily be obstructed by gear that is transported, additional passengers in the vessel, so that the underwater view can present a more reliable detection of the rowing or paddling. To facilitate the detection of the motion with camera 632, 635, it is possible to further equip paddles, gloves, wetsuit sleeves, wrist protectors, ores or other paddling device 680 with a motion tracking marker 682, for example a marker that can be easily detected and tracked by image tracking algorithms, despite different viewing angles. For example, the motion tracking marker 682 can be placed, attached or otherwise made in white color on the center of the paddle blade, the paddle blade being black, to enhance the contrast of the pattern.

Position sensor devices 30, 230, 430, 532 can be implemented with different technologies and measurement principles. For example, they can be made of a strip of flexible or semi-flexible printed circuit board serving as a substrate embedded in a side wall of a body of watercraft. Attached to an upper surface of strip, a series of discrete sensor elements can be arranged, for example optical presence measurement sensors including individual light sources, such as LED, that are each associated to a photodiode, to measure light reflections from an arm, leg, or paddling device of user when passing by the sensor. For underwater measurements, blue light can be emitted, to minimize absorption of the emitted light in water. In case the optical sensor in form position sensor device 750 is used in air, NIR LEDs can be used, with a wavelength larger than 760 nm, to make the sensing invisible to the human eye. It is also possible that the optical sensor is arranged on paddle, and a detection pattern visible by optical sensor is arranged on a side of hull of watercraft.

In another variant, position sensor devices 30, 230, 430, 532 can be made of a linearly-arranged array of capacitive position sensors for each position sensor 32, 34, configured to detect a position of a body part. This measurement can be based on the different dielectric constant of the human body as compared to water, as the position sensor device 30 can be submerged in the water body, when powered watercraft 100 is operated as a surfboard. Generally, the dielectric constant of water is higher than the dielectric constant of body parts. At 900 MHz, the dielectric constant of the is 48.09, bone is 13.27, muscle 57.60, fat 5.60, while water 78.00, and salt water is slightly lower than the dielectric constant of salt water, for example sea water. Moreover, the dielectric constant of air is 1. Therefore, with an array of capacitive position sensors for sensors 32, 34, a decrease and therefore a change in capacitance can be measured when a bodily part, for example an arm of a surfer, is passed along sensors 32, 34.

In variant, the linear position sensors 32, 34 can be made of that detect a magnetic field generated by a permanent magnet. For example, linear position sensor can be made of a linear array of hall effect sensors that are arranged along the sides of body 10. The permanent magnet can be attached to either paddling device as explained above, or as a flexible permanent magnet strips can be integrated into a sleeve of a wetsuit. In another variant, position sensor device 30 can be made with sonar sensors or other types of ultrasonic detection techniques. On each side of the hull, a sonar transducer and a linear array of hydrophones can be attached to each side of hull, under the waterline, to detect rowing or paddling motion of the user. Sonar transducers producing acoustic underwater beams could be arranged to emit sound waves sideways-downwardly away from hull of watercraft, to avoid reflections from water surface, configured to detect short sensing distance in a range preferably between 20 cm and 80 cm to detect paddles and oars.

In other variants, when used above the water body WB, position sensors 32, 34 can be made as a linear array of time-of-flight sensors that can detect motion and position. In another under-water variant, a linear array of water pressure sensors can be used, to detect and measure changes in water pressure. This measurement principle can be compared to the lateral line organ of living fish. Different water pressure profiles and their timely evolution that are generated by the paddling or rowing motion can be associated to different levels of thrust generated by user, and a correspondence to set values for power electronic device 70 and motors 63, 64 can be calculated or provided in a look-up table, the calculations and storage of data done in controller 40.

The above described measurement principles for detecting and measuring a value indicative or presentative for an amplitude of first thrust $T_p$, for example by a motion of hand, arm, or paddling device of a user are not exclusive and other measurements can be used. Also, two or more of these measurement principles can be combined to be used in parallel, to simultaneously have two independent measurements, to prevent parasitic effects, eliminate noise, use for learning a neural network and artificial intelligence, and improve reliability of the measurements.

Figure 9C:
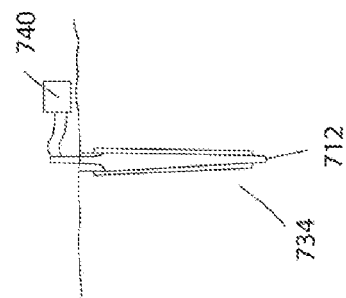
FIGS. 9B and 9C show a bending force measurement device made or integrated to a fin 712, according to still another embodiment.
Figure 9B:
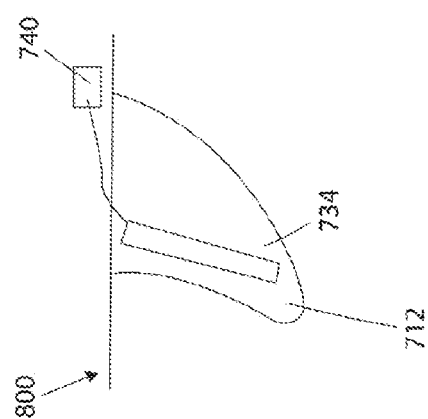
Figure 9A:
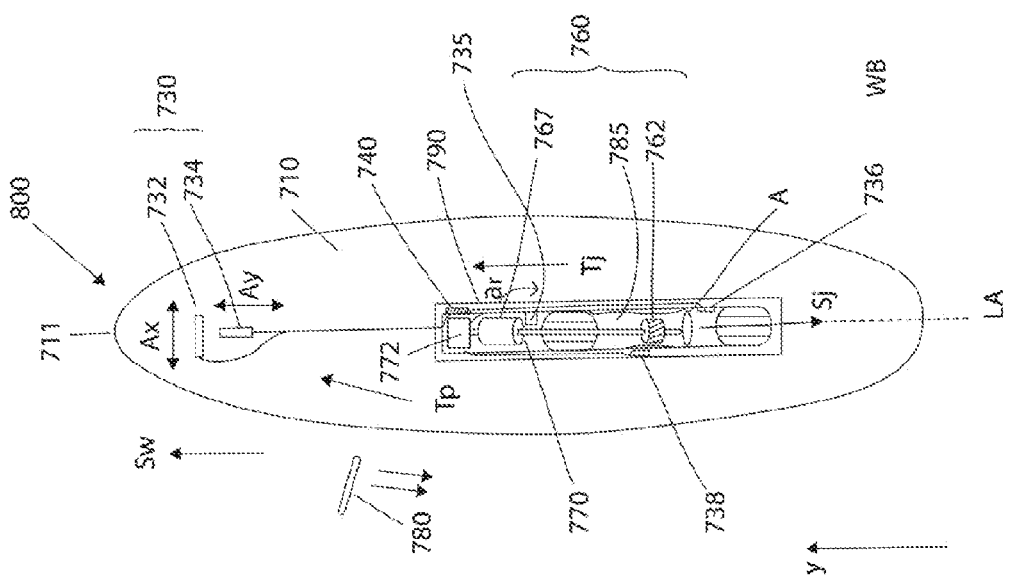
FIG. 9A shows a top exposed view watercraft 800 having an acceleration sensor 730 in the body or otherwise attached to body.

Next, in the embodiment shown in FIG. 9A, schematically a watercraft 800 is shown, that uses acceleration sensor 730 that are embedded or built in hull 710 of watercraft 800, without having a motion or force measurement sensor. Watercraft 800 is shown schematically, having hull 710, which could be one of but not limited to a surfboard, SUP board, kayak, canoe, raft. In this variant, the motion of paddling or rowing itself is not measured at all, the paddling or rowing symbolized by reference numeral 780. Instead, watercraft 800 is equipped with an acceleration sensor 730 that is arranged inside or in connection with hull 710, so that accelerations to hull can be measured, having an x-axis measurement sensor 732 for measuring lateral accelerations $a_x$ along the x-axis, and a y-axis measurement sensor 734 for measuring longitudinal accelerations $a_y$ along the y-axis, in the propulsion direction of watercraft 800, as referenced to the coordinate scale shown in FIG. 9A, also shown in FIG. 10A. This allows to measure a single indicative value of first thrust $T_p$ without the need of devices that are external to watercraft 800. For explanation purposes, it is assumed that the coordinate system is fixed relative to watercraft 800, and the y-axis being parallel to longitudinal axis LA of watercraft 800. Instead or in combination of using an x-axis accelerometer 732, an angular acceleration or angular rate sensor or gyroscope 735 could also be used, or a multi-axis IMU 44 (FIG. 2C). Angular acceleration or angular rate sensor 735 could be placed close to a center of gravity of watercraft 800 to measure an angular acceleration $a_r$, the angular acceleration being defined as an angular acceleration around a rotational axis that is parallel to the z-axis. For simplification purposes, the rotational axis is considered to traverse a center of gravity of watercraft 800. When the angular rate or angular rotation ω is measured, controller 740 can calculate angular acceleration $a_r$ by calculating the derivative of it. In a variant, a vertical acceleration $a_z$ along the z-axis with acceleration sensor 730 could also be measured. Acceleration sensor 730 is operably connected to controller 740, so that signals of the different acceleration directions or angular accelerations are provided to controller 740. Moreover, a flow velocity measurement sensor 736 can be arranged to measure an exit flow velocity $s_j$ of water exiting propulsion system 760, and operably connected to controller 740. In the example shown, flow velocity measurement sensor 736 is arranged at an inner wall of water duct 785, downstream of a main flow direction of impeller 762, to precisely measure an exit flow velocity $s_j$ at the exit of the propulsion system 760. Also, a water velocity measurement sensor 738 is also placed on lower surface of hull 710 and can be used to measure a speed of hull 710 of watercraft 800 relative to water body WB, and operably connected to controller 740. Water duct 785 forms a flow cross-sectional area A. In this embodiment, it is possible to include all sensors and controller, and other devices for measuring the first thrust $T_p$ and for generating the second thrust $T_j$ inside a waterproof propulsion box, container or casing 790.

In this embodiment, an acceleration of hull 710 of watercraft 800 is measured with sensor 730, for example an IMU, or changes related to a speed of water body WB relative to hull 710 of watercraft to determine acceleration of hull 710. However, these measurements are indicative of an acceleration that represents total thrust $T_t$ being an addition of first thrust $T_p$ generated natural motion, and second thrust $T_j$ generated by propulsion system 760. Accordingly, to calculate or otherwise determine a set value for power electronics device 772 and motor 767 for generating second thrust $T_j$ based on the manually generated first thrust $T_p$, the actual value of the first thrust $T_p$ needs to be determined by controller 740. As the acceleration measurements will be a result of the superposition of the first thrust $T_p$ from the rowing or paddling 780 and second thrust $T_j$ generated by propulsion system 760, it has to be determined which percentage, part, or value of this measured acceleration of watercraft 800 is caused by which part of the thrust.

Thrust is expressed in SI units as Newton [N] or as $$\left[\frac{kg \cdot m}{s^2}\right],$$

and is equivalent to force. In the following equations, the drag as a force that counteracts against the thrust is not taken into account, for simplification purposes.

$$T_t = T_p + T_j \tag{3}$$

The below equation describes, in a simplified fashion, the second thrust $T_j$ generated from a jet drive of a watercraft in a water as a fluid.

$$T_j = \rho \cdot Q \cdot (s_j - s_w) \tag{4}$$

Where ρ is the density of water, Q is the volumetric flow rate of the water exiting the propulsion system 760, $s_j$ the exit flow velocity of the water exiting the jet drive, and $s_w$ the velocity of the watercraft 800 relative to water body WB. The volumetric flow rate Q can be expressed by the following equation, volumetric flow rate being expressed in SI units as $$\left[\frac{m^3}{s}\right].$$

$$Q = s_j \cdot A \tag{5}$$

Where A is the cross-sectional area of the water duct 785 of propulsion system 760 of watercraft 800.

For the present embodiment, mass M can be considered be the entire mass of watercraft 800 including the mass of user, for example a paddler, kayaker, canoeist, surfer, boarder. Moreover, acceleration $a_t$ of watercraft 800 can be expressed by Newton's second law, in SI units $$\left[\frac{m}{s^2}\right],$$

when the mass M of watercraft including user is known, and is an addition of the acceleration $a_p$ provided by the first thrust resulting from the manual paddling or rowing, and the acceleration $a_j$ provided by the second thrust from propulsion system 760.

$$a_t = \frac{T_t}{M} \tag{6}$$

$$a_t = a_p + a_j \tag{7}$$

When using these equations, it is possible to calculate the first thrust $T_p$ generated by the user with his paddling motion, in case the total thrust $T_t$ that is applied to watercraft 800 is known or measured, for example by acceleration sensor 730.

$$T_p = a_t \cdot M - \rho \cdot s_j \cdot A \cdot (s_j - s_w) \tag{8}$$

This equation can be solved to determine a portion of acceleration a that is generated by propulsion system, the second thrust $T_j$, in the following equation labelled as acceleration $a_j$.

$$a_j = \frac{T_j}{M} \tag{9}$$

$$a_j = \rho \cdot s_j \cdot A \cdot (s_j - s_w) / M \tag{10}$$

Given the above discussed coordinate system and the orientation of propulsion system 760, it can be assumed that any acceleration that is generated by second thrust $T_j$ will be predominantly along the y-axis, and therefore measured by sensor 734 that measures the longitudinal acceleration along the y-direction.

Instead of measuring water exit flow velocity $s_j$, in a variant, it is also possible to calculate this velocity from the electrical values of motor 767, for example by measuring power consumption by motor 767 or power delivered by power electronic device 772, or by measuring a rotational speed ω of impeller or propeller 762 driven by motor 767 by propulsion system. Power delivered by propulsion system 760 is designated as $P_j$, and can be expressed in SI units as [W] or $$\left[\frac{kg \cdot m^2}{s^3}\right].$$

$$P_j = T_j \cdot s_j \quad (11)$$

Power of propulsion system 760 can be also simply calculated based on the electric values of motor 767. Also, the when measuring rotational speed ω of impeller or propeller 762 driven by motor 767, for example but not limited to hall effect sensor, rotational encoder, or by using the set value that is set by power electronics device 772, when operating as an electronic speed control, a value for the second thrust $T_j$ can be calculated by the following equations.

$$P_j = U \cdot I \quad (12)$$

$$\omega^2 \propto T_j \quad (13)$$

$$\omega \propto \sqrt{T_j} \propto \sqrt{a_j} \quad (14)$$

in which U is the voltage supplied to motor 767 and I the current delivered to motor 767. In the above equations, losses that are caused by motor 767, power electronic device 772, drag of hull 710 in water body WB, and transient behavior are neglected for simplification purposes. For more detail and detailed discussion on waterjet propulsion systems and the calculation of different values, the Ph.D. dissertation from Norbert Bulten can provide for more guidance. Bulten, Norbert Willem Herman, "Numerical analysis of a waterjet propulsion system." Dissertation Abstracts International 68.02 (2006), this document herewith incorporated by reference in its entirety.

As shown, the second thrust is roughly proportional to the square of propeller or impeller 762 rotational velocity ω, and therefore the acceleration $a_j$ and thrust $T_j$ that is generated by propulsion system 760 can be calculated, without the need of measuring any water speeds. These calculations can be further processed or transformed into more accurate values, by taking into account electric losses and mechanical drag. For example, by using an approximation calculation with percentages or by using a look-up table with the controller 740, acceleration $a_j$ and second thrust $T_j$ that is generated by propulsion system 760 can be calculated and refined, and then subtracted from the total thrust $T_t$ measured on watercraft 800, or subtracted from acceleration $a_y$, to obtain the first thrust $T_p$ that is a result from the paddling or rowing, or the acceleration $a_p$ obtained by paddling or rowing. For example, a correspondence table between rotational speed ω that can be measured or can be directly read as being a set value, and a value indicative of the second thrust $T_j$ can be created. Also, for calculation purposes by controller 740, as velocity $s_w$ of the watercraft 800 relative to water body WB is usually substantially smaller than water exit flow velocity $s_j$, and therefore, this measurement can be neglected or not measured at all.

Accordingly, based on the above discussion, in this embodiment, the controller 740 can calculate a set value for power electronic device 772 that can be based on the following equation.

$$set = \sqrt{(a_y - a_j)} \cdot k \cdot w(t) \cdot f(t) \quad (15)$$

In Equation (15), set is a set value for power electronic device 772 or motor 767, for example a set value for rotational speed for motor 767, k is a constant proportional factor for normalization and weighting, for example to provide for an amplification or assistance of first thrust $T_p$ that results in a second thrust $T_j$ that is proportional by a certain percentage to first thrust $T_p$, for example but not limited to an assistance factor. f(t) is a filtering function, for example a band pass filter to remove noise or other captured acceleration signals from $a_x$ that are not part of the measured acceleration, and $a_j$ is the value of the acceleration that is provided by propulsion system 760, calculated by controller 740. With equation (14), it is possible to set the rotation speed for impeller 762 of propulsion system 760 in a way that the second thrust, generated by propulsion system 760 is proportional to first thrust, generated by paddling or rowing 780. As discussed above, instead of using the above equation, a look-up table or correspondence table can be used that is stored in a memory of controller 740, based on experimental test and results, to match measured accelerations with desired set values to generate a corresponding second thrust $T_j$.

In a variant, accelerometer 730 is a three-axis accelerometer for measuring accelerations along the three axes x, y, z. This allows to create a three-dimensional acceleration vector for watercraft 800 at a certain sampling rate. Preferably, to provide for precise amplification and a fast response time of first thrust $T_p$, a sampling rate of more than 100 Hz is desired, preferably more than 200 Hz. Controller 740 can be configured to process the signals from sensor 730 as a vector, to extract other type of information other than the acceleration $a_p$ caused by the manual paddling or rowing motion. For example, with a combined measurement of x-acceleration, y-axis acceleration, z-axis acceleration, it can be determined if user has placed himself on watercraft 800, has left watercraft 800, or in case watercraft 800 is a surfboard, it can be determined whether the user stood up on the surfboard. Also, accelerations that are caused by waves and other water movements can be filtered out. Acceleration vector from acceleration sensor 730 can be analyzed by controller 740 based on modeling of a reference acceleration vector, and a matching algorithm to detect rowing or paddling, to detect the standing up, or to detect when a user removes himself form watercraft 800.

Also, it is also possible to combine the measurement principles of the other embodiments with the measurement of the acceleration with of sensor 730. For example, movements of the hand or paddle can be detected by motion or position sensor device 30, or force measurement sensors 272, 274. This multi-sensor approach in determining a value of the first thrust can increase the reliability of the measurement, and can also avoid powering propulsion system 760 based on false or parasitic measurements of acceleration, for example when watercraft hits another object, is pushed by someone who is not using the watercraft 800. For example, sensor 30 can be used as a simple presence sensor to determine if a user is actually paddling or rowing, and given a signal to controller 740 to evaluate the accelerations from sensor 730 for determining a set value for propulsion system 760.

In a variant shown in FIGS. 9B and 9C, instead of measuring linear forward acceleration $a_y$ by a linear accelerometer 734 of acceleration sensor 730, it is also possible to equip the fin 712 of watercraft 800 with a bending measurement system, so that lateral bending along the x-axis can be measured. This can be done by equipping an existing fin 712 with bending measurement sensors, for example a strain gauge strip on each lateral side of fin 712, so that a highly-sensitive differential measurement of lateral bending of fin 712 can be measured. Bending measurement sensor can be operatively connected to controller 740 for further data processing on this information, to determine a value that corresponds to the paddling or rowing motion. The absolute lateral bending of fin 712 is proportional to a lateral movement or speed of watercraft 800, so that by calculating the derivative of the absolute bending, a value is obtained that is proportional to the lateral linear acceleration $a_x$. This value can be used for calculation of the set value for propulsion system 760, in lieu or together with the direct measurement of the lateral linear acceleration $a_x$. In another variant, a specially purpose-built fin 712 can be used for this measurement, that bends easier than conventional fins, and can be arranged in close proximity of controller 740.

Figures 10A, 10B:
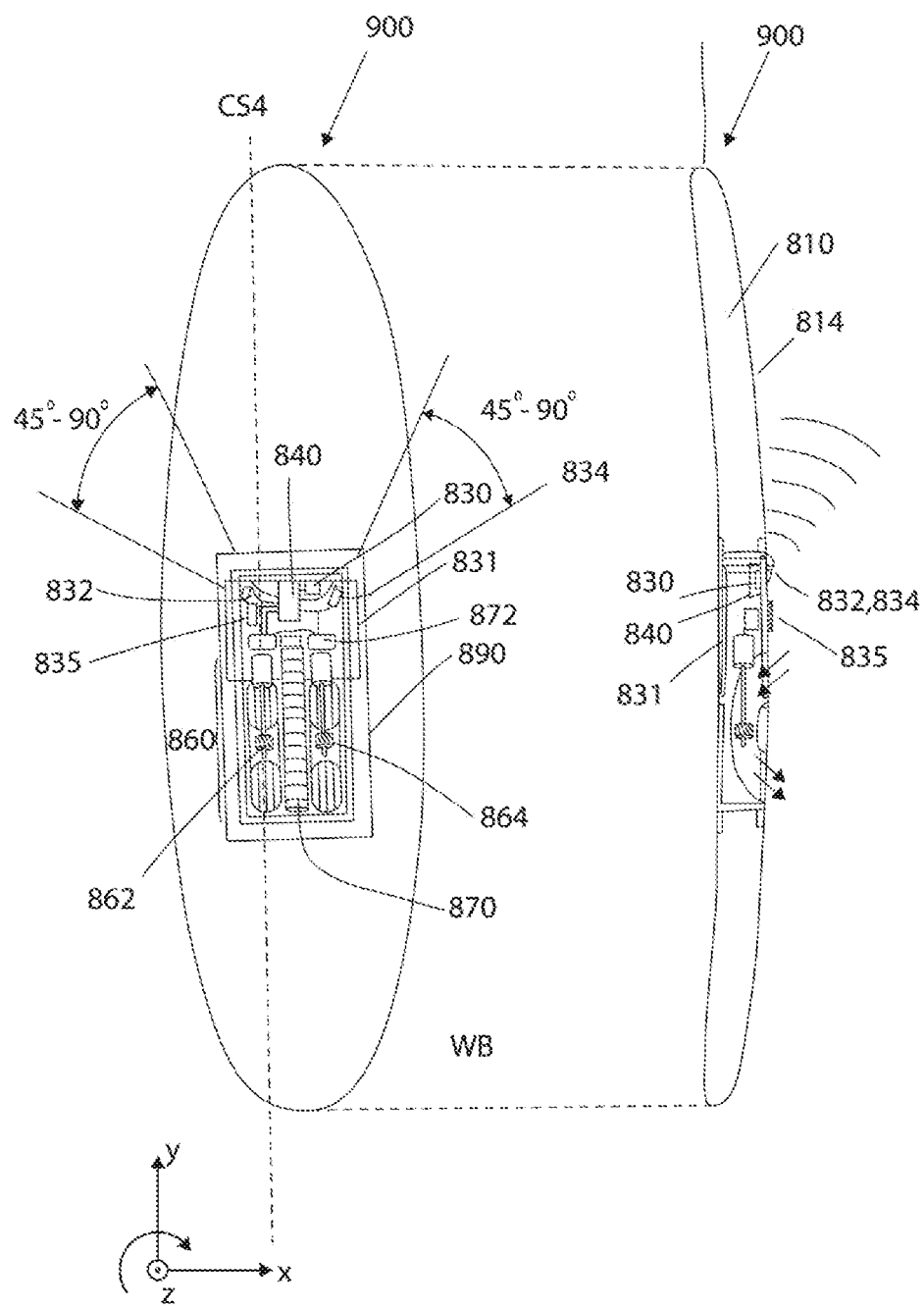
FIG. 10A shows a top exposed view watercraft 900.
FIG. 10B shows a cross-sectional view along line CS4.
Figure 10C:
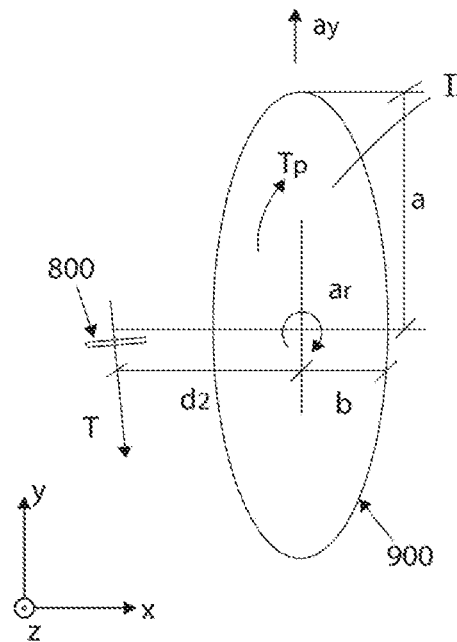
FIG. 10C shows a simplified schematic to explain the torque, moment of inertia, and angular acceleration of watercraft 900.

FIG. 10A shows another embodiment of the present invention, showing a top exposed view of watercraft 900 that has a box, container, casing, or enclosure 890 including all necessary elements for the assisted or amplified propulsion, with no external measurement devices to box 890, and FIG. 10B showing a cross-sectional view thereof, along line CS4 of FIG. 10A. Moreover, FIG. 10C shows a schematic representation of the torque T that is acting on watercraft 900 due to paddling or rowing 880, and the angular acceleration $a_r$ and linear forward acceleration $a_y$ caused by the paddling or rowing. In this embodiment, a box 890 or waterproof container is arranged substantially at a center of gravity of watercraft 900. Waterproof container 980 includes a propulsion system 860 with two jet drives with respective impellers 862, 864, a controller 840, an acceleration sensor 830 that can at least measure the angular acceleration $a_r$ of watercraft 900 clockwise or counterclockwise around the z-axis, as indicated in FIG. 10A, a battery pack 870, power electronics 872 to deliver controlled power to the propulsion system 860. Power electronics 872 can receive a command or set value from controller 840, and can power impellers 862, 864 to a desired rotational speed. Acceleration sensor 830 is located inside waterproof propulsion container 890, or otherwise mechanically affixed to it such that it accelerates with any acceleration that is applied to the waterproof propulsion container 890, or the watercraft 900 itself.

In this embodiment, the set value for the propulsions system 860 is generated based on the angular acceleration $a_r$ to watercraft 900. As shown in FIG. 10C, showing a simplified schematic representations of the physical effects on watercraft 900 for explanatory purposes, when a paddler or rower acts by paddling device, hand, leg, etc., represented by reference numeral 880, and pulls, pushes, or otherwise moves element 880 in a negative y-direction to create a first manually generated thrust $T_p$, element 880 is located at a distance $d_2$ from the center of gravity of watercraft. Therefore, because of the offset, a torque T is applied to watercraft 900 towards the negative y-direction, that will cause an angular rate or rotational speed ω to watercraft, and an angular acceleration $a_r$. The application of torque T causes rotation, but also a translation movement to watercraft 900 due to the fact that the position of element 880 and direction of application of torque T relative to watercraft 900 changes during the movement of paddling or rowing. This will also cause a linear acceleration $a_y$ component to watercraft 900. For paddling or rowing efficiency, a skilled user will row or paddle to minimize creation of rotation around the z-axis to watercraft 900. Also, fins and underwater body shape that will cause watercraft 900 to advance linearly, and provide for a certain resistance to rotation, to contribute to the linear acceleration $a_y$. In a variant, instead of using angular acceleration $a_r$ as a value that is indicative of the first thrust, it is also possible to measure lateral acceleration $a_x$ instead. However, the use of the angular acceleration $a_r$ presents the advantage that an angular acceleration measurement sensor can be used that can be placed close to the center of gravity of watercraft 900, within box 890, while the lateral acceleration sensor 732 for measuring $a_x$, shown in FIG. 732 in FIG. 10A, would have to be placed away from the center of gravity to actually capture these accelerations. However, generally, the principles described herein for the angular acceleration $a_r$ for calculating the set value by controller 840 are also applicable to the use of a lateral acceleration $a_x$.

Also, second thrust $T_j$ from propulsion system 860 can be such that it only contributes to linear acceleration $a_y$ of watercraft 900, in the case where both impellers 862, 864 are powered equally, or if there is only one impeller 762 as shown in the embodiment of FIG. 10. This is the case because the second thrust $T_j$ only acts along the y direction. Therefore, unlike in the previous embodiment, the angular acceleration $a_r$ is not or only marginally influenced by the acceleration and propulsive thrust $T_j$ from propulsion system 860. As a consequence, when measuring angular acceleration $a_r$ as a reference value for generating a set value for propulsion system, i.e. by generating a second thrust $T_j$ that is proportional to the angular acceleration $a_r$, it is not necessary to deduct or subtract any part that is caused by the second thrust $T_j$. This allows to simplify the calculations and use less sensors to estimate a contribution to the movement of watercraft 900 by propulsion system 860.

Also, to avoid that individual powering of impellers 862, 864 influence the angular rate and angular acceleration $a_r$ of watercraft 900, in this embodiment, impellers 862, 864 can be powered by the same set value, to make sure that they equally contribute to the acceleration of watercraft 900 in the y-direction, and to not contribute to any or very little acceleration in the x-direction, or angular acceleration $a_r$.

For example, other than the measurement of the acceleration including a measurement of angular acceleration $a_r$, no other measurements are necessary to calculate the set value. Therefore, this embodiment presents the advantage that it allows to limit any measurements done by sensors that are located inside the waterproof enclosure 890, or waterproof propulsion container 890. No external motion, acceleration, or force measurements or other type of control signals are necessary to generate the set value for propulsion system 860. For example, there is no need to measure, via an external device, a force, a bending, or an acceleration on paddle, oar or swimfin, as shown in FIGS. 4E, 5, and 7B. This allows to keep the watercraft 900 simpler, without the need of any device that is external to waterproof enclosure 890. Also, waterproof enclosure 890 with all its elements can be used to retrofit existing watercrafts with the amplified paddling system, without the need to add any extra devices, other than a cavity in watercraft 900 to accommodate waterproof propulsion enclosure or box 890.

In a variant, the only external signal that can communicate with the waterproof propulsion box 890 and its controller 840 could be a smart phone, tablet or similar device that has a specific application or app installed thereon, for setting certain parameters of waterproof propulsion box 890 via a Bluetooth® interface, an underwater wireless sensor network interface, or other type of wireless interface, for example by using ultrasonic signal transmission via the water body. Also, the specific application could be used to display signals and measurements from box 890. For example, via specific application, a weight of the user can be set to properly calculate weight-specific set values, wind conditions such as strength and direction, water conditions including currents and waves, can be the amplification factor can be set so that the user can define his desired value of amplification of the first thrust by generating a proportional second thrust, and a status of box 890 can be checked, for example but not limited to the checking whether water leakage inside the box has occurred, the checking of the battery charge level, the performing and displaying of results of a system check, uploading a new firmware for controller 840. Also, the application can be used to enable or disable the system, without the need of any physical switches or buttons. Also, it is possible via the specific application to download GPS routes or tracks to the propulsion box 890.

However, because the causation of an angular acceleration $a_r$ is nearly unavoidable, and presents a value that is at least somewhat proportional to the first thrust $T_p$ generated by the user, it can be measured by acceleration sensor 830 and used for the set value to power electronics device 872, to create the second thrust $T_j$ by controller 840. For example, the following equations show these physical relations. In these equations, any resistance to the torque due to water resistance and other factors are neglected.

$$T = I \cdot a_r = d_2 \cdot F \qquad (16)$$

In this equation, T is the torque applied by element 880, I is the moment of inertia of watercraft 900 including the user, to take the weight of user into account, expressed in the units a $$\left[\frac{kg}{m^2}\right],$$

$a_r$ is the angular acceleration expressed in the units $$\left[\frac{rad}{s^2}\right],$$

F is the force applied by user with element 880, $d_2$ a distance between element 880 and center of gravity of watercraft 900. For simplification purposes, an angle between $d_2$ and application of torque T is considered 90°. The moment of inertia can be calculated as follows, using the equation for ellipse that approximates the shape of watercraft 900. It is also possible to use the moment of inertia of ellipsoids for this purpose.

$$I = \frac{1}{5} \cdot M \cdot (a^2 + b^2) \qquad (17)$$

With M being the mass of watercraft 900 with user, a being the major axis of the ellipse, and b being the minor axis of ellipsoid. The major axis a can be as short as around 0.8 m for a surfboard, and up two about 3 m, for a sea kayak. Next, the angular acceleration $a_r$ from paddling or rowing can be estimated or approximated by the following equation:

$$a_r = \frac{T \cdot d_2}{I} \qquad (18)$$

Given a paddling or rowing torque of about 25 N, a distance $d_2$ of about 30 cm, and a numerical value for the moment of inertia of 37.44, with a mass M of 80 kg, major axis a of 1.5 m for a longboard, and a minor axis b of 30 cm, and angular acceleration $a_r$ of about 0.2 rad/s² will result. In reality, due to the water resistance, this value for angular acceleration is substantially smaller, and should be divided by a factor, for example between 2-5. Based on the above discussion, with watercraft 900 and controller 840, a set value for power electronic device 872 or propulsions system 860 can be calculated as follows:

$$set = \sqrt{a_r} \cdot k \cdot w(t) \cdot f(t) \qquad (19)$$

In Equation (19), set can be a set value to set rotational speed for motor of propulsion system, k is a constant proportional factor for normalization, for example to provide for an amplification or assistance of first thrust $T_p$ that results in a second thrust $T_j$ that is proportional by a certain percentage to first thrust $T_p$, for example but not limited to an assistance factor of 20%, 50%, 100%, 150%, or more, w(t) is a weighting function that can be used as a time dependent function, and f(t) is a filtering function. As discussed above, a similar relationship can be established by a look-up or correspondence table.

As a natural paddling or rowing motion by the user to watercraft 900 very often will include an angular acceleration $a_r$ component, but also a linear forward acceleration $a_y$ component, the signal from acceleration sensor 830 that represents linear forward acceleration $a_y$ can be used to further process the data for the angular acceleration $a_r$ by controller 840, when determining a set value to generate the second thrust $T_j$ with propulsion system 860. For example, by using the sign function on the signal representing linear forward acceleration $a_y$, simple angular accelerations to watercraft 900 can be determined as being part of other forces than the rowing or paddling. In other words, when no forward linear acceleration is present, it can be safely said that an angular acceleration is not a result from any paddling or rowing by the user. On this basis, Equation (20) can be used to calculate a set value for the propulsion system 860, for example to set the rotation speed of impellers 862, 864:

$$set = \sqrt{a_r} \cdot sgn(a_y) \cdot k \cdot w(t) \cdot f(t) \qquad (20)$$

Moreover, when calculating the set signal for propulsion system based on accelerations, any sharp or high-frequent acceleration that is measured by sensor 830 can be filtered out with a filtering function f(t). Any paddling or rowing will result in relatively gentle accelerations of watercraft 900 in water body WB, while impacts from the ground of water body WB, objects in the water body, collisions with other devices and users, knocking or jerking of watercraft 900 by other users will result in higher accelerations. Therefore, a low-pass filter can be employed to remove any accelerations that are above a certain threshold. In a non-limiting example, for linear accelerations, any acceleration over 0.5 g can be filtered out. Preferably, the range of accelerations that should be taken into consideration by controller 840 for generating the set value can be in a range between 0.0005 g to 0.5 g. More preferably, the range of accelerations to be taken into account for the set value can be between 0.002 g to 0.5 g. Of course, these values can different with different mass M of watercraft 900 and user, for example for a heavy sea kayak. However, at the same time, it is preferable that the low-pass filter is designed such that it does not introduce any or only a very small time delay to the measured signal, so that the lag of the second thrust $T_j$ relative to the first thrust $T_p$ can be minimized, when controller 840 is generating a set value for propulsion box 890. This allows to further preserve a natural feeling of the amplification or assistance of the paddling.

Another aspect of the embodiment shown in FIGS. 10A-10D is the use of additional sensor to assist in the calculation of the set value based on the angular acceleration $a_r$. For example, waterproof container 890 is equipped with presence detection sensors 832, 834 that are connected to controller 840, sensors 832, 834 configured to detect a presence of element 880 for paddling or rowing, one each arranged to cover a certain angle of view to cover the lateral left and right side of watercraft 900, where the paddling or rowing is expected to perform. Sensors 832, 834 can be embodied as short-distance sonar sensors, with a detection distance between 15 cm and 80 cm, covering an angle of view between 45° and 90°. Signals from sensors 832, 834 can be used to enable the calculation of set value for propulsion system 860 based on angular acceleration $a_r$. For example, in case no presence signal from either left sensor 832 and right sensor 834, the angular acceleration may be due to another factor than rowing or paddling, and therefore no second thrust $T_j$ should be generated by propulsion system 860. Depending presence on left and right 832, 834, and whether the angular acceleration is positive or negate, i.e. is clockwise or counterclockwise, the following powering signals for propulsion system 860 can be generated, shown in Table I, to generate either a forward or a rearward second thrust $T_j$.

TABLE I

| Thrust $T_j$ | Clockwise angular acceleration $a_r$ | Counterclockwise angular acceleration $a_r$ |
|---|---|---|
| Presence left sensor 832 | Forward Thrust (left stroke) | Rearward Thrust (left stroke) |
| Presence right sensor 834 | Rearward Thrust (right stroke) | Forward Thrust (right stroke) |

Another sensor that is used with waterproof container 890 is the water detection sensor 835 that allows to detect whether watercraft 900 is placed on water body WB or not, and can deliver a corresponding signal to controller 840. If no water is present, any set signal for propulsion system 860 can be disabled by controller. Water detection sensor 835 can also be accommodated such that it is arranged at a lower surface of waterproof container 890. This detection can be used as a safety feature to avoid powering propulsion system when watercraft 900 is not in the water body WB. Moreover, an additional sensor that is used is a presence detection sensor 831 that can detect whether the user is placed on watercraft 900 or not. This sensor 831 can be embodied as a surface pressure sensor with resistive layers, as a capacitive surface sensors, or other types of detection sensors, for example a sensor that detects whether the user is sitting on a seat of a kayak or canoe. Sensor 831 can deliver the signal to controller 840, and based on this signal, any powering signal from controller 840 to propulsion device 860 can be disabled or enabled. Again, this signal can be used as a safety signal to prevent erroneous powering of watercraft 900, for example, in a case where user falls off the watercraft 900. The signals of the different sensors are summarized in Table II below.

TABLE II

| DETECTION | SENSOR |
|---|---|
| Presence of watercraft 900 in water body WB | Water detection sensor 835 |
| Detection of left paddling/rowing in WB | Left sonar sensor 832 |
| Detection of right paddling/rowing in WB | Right sonar sensor 834 |
| Angular acceleration $a_r$ | Accelerometer 830 |
| Linear acceleration $a_y$ | Accelerometer 830 |
| Body of user on watercraft | Detection sensor 831 |

Figure 10D:
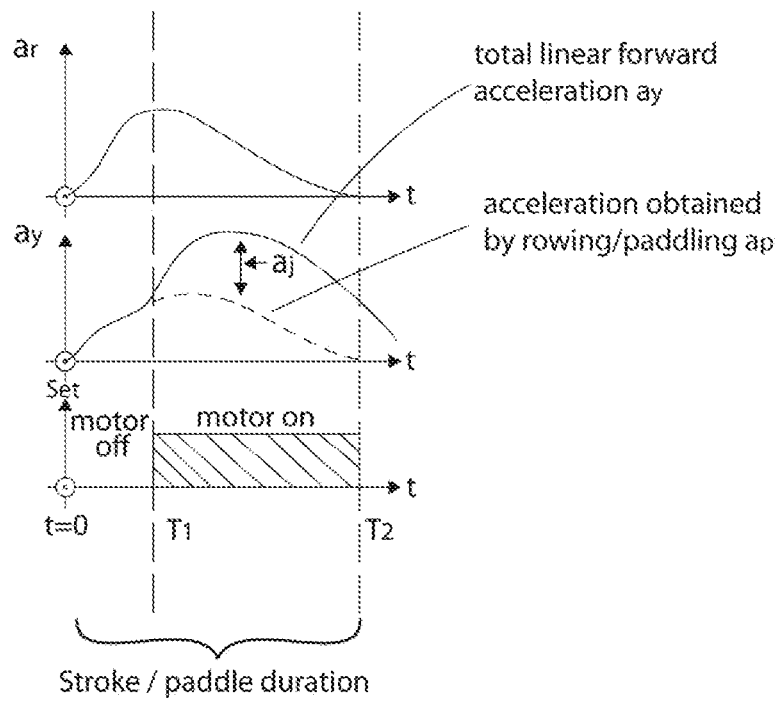
FIG. 10D shows exemplary graphs for different acceleration measurements and motor activation.

In another variant, instead of deducting the acceleration $a_j$ that results from propulsion system 860 to calculate the acceleration $a_p$ of the natural paddling/rowing, it is also possible to use an inherent time delay between a time when a user starts his paddling or rowing motion, from the time when motors of the propulsion system 860 is activated. This principle is schematically shown in FIG. 10D. For example, while the acceleration is measured by sensor 830, at a time instant t=0, a user will start his paddling/rowing movement, by initiating the performance of a paddling/rowing stroke. This will cause some angular acceleration $a_r$, some lateral acceleration $a_x$, but also linear forward acceleration $a_y$. At this time, propulsion system 860 does not generate any second thrust, i.e. the motor is off. This means that no part of the acceleration $a_y$ will be caused by propulsion system 860. Next, at a time instant $T_1$, after a set value has been calculated by controller 840, the propulsion system 860 is activated to generate second thrust $T_j$ to a desired value. This will immediately be measurable and seen in the forward linear acceleration $a_y$. Next, at a time instant $T_2$, the natural paddling/rowing motion, i.e. one paddling/rowing stroke ends. Therefore, instead of calculating a set value by controller 840 over the entire period of stroke from time 0 to $T_2$, to simplify the calculations and measurement of the acceleration $a_p$ that is the result of the manual paddling/rowing, only the period from time 0 to $T_1$ is used to analyze the accelerations and to generate a set value by controller 840 for propulsion system 860. Once the motor of propulsion system 860 is on, and a second thrust is generated, from time instant $T_1$ on, the acceleration measurements are disregarded and not further analyzed for purposes of calculating the set value.

For example, within the time period $T_1$ or a shorter time period $T_m$ that covers at least a part of the period of the manual stroke, the maximal detected acceleration value for $a_y$ can be used to calculate the set value, based on Equation (21).

$$\text{set} = \sqrt{\max(a_y(t)_{t=T_m})} \cdot k \cdot w(t) \cdot f(t) \qquad (21)$$

In another variant, an average value of the acceleration $a_y$ within a time period $T_m$ can be calculated and used to calculate a set value for propulsion system 860, or a combination of the maximal and the average value, or other statistical values, like median value. Next, acceleration measurements are disregarded and the controller 840 calculates a set value, for example a desired rotational speed ω for one or more motors of the propulsion system 860 and a duration that the desired rotational speed is maintained. For example a look-up table can be used to set a rotational speed and duration of propulsion, based on the measured and statistical calculations on forward linear acceleration $a_y$ during time period $T_m$. In sum, in this variant, the forward linear acceleration $a_y$ is considered only for a part of time period $T_m$ of the stroke duration $T_2$, preferably right in the beginning of the stroke, and once a value has been determined the composite acceleration including $a_p$ and $a_j$ is disregarded for purposes of calculating the set value.

Figure 11C:
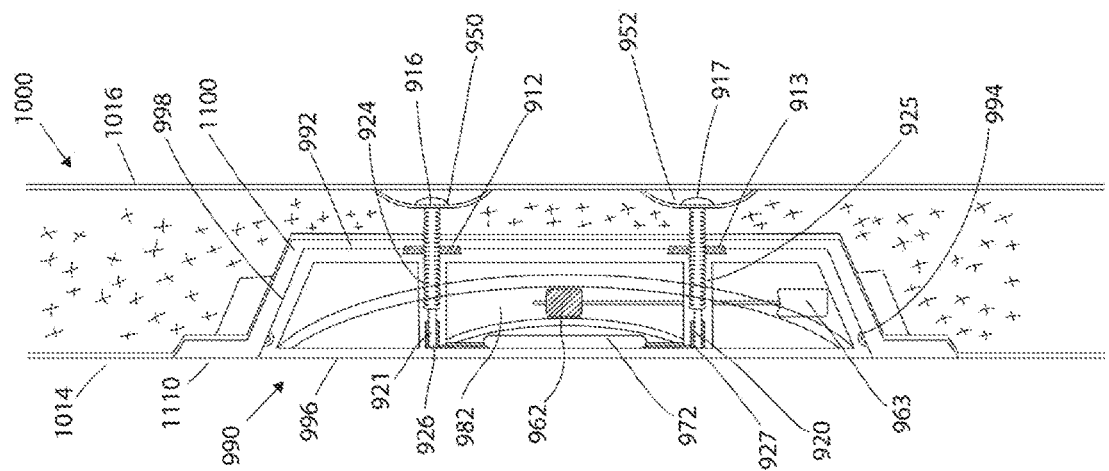
FIG. 11C shows a schematic cross-sectional view along line CS5 of FIG. 11A of the waterproof propulsion container 990 integrated into a watercraft 1100 according to another embodiment.
Figure 11A:
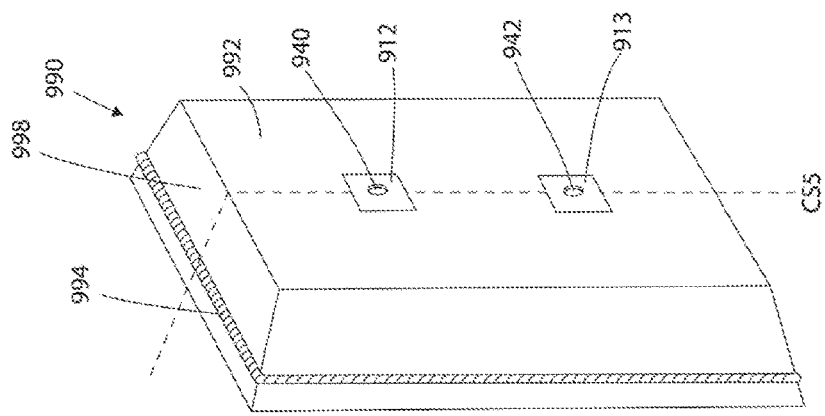
FIGS. 11A and 11B show schematic perspective view of a waterproof propulsion container 990 from the rear and the front side.
Figure 11B:
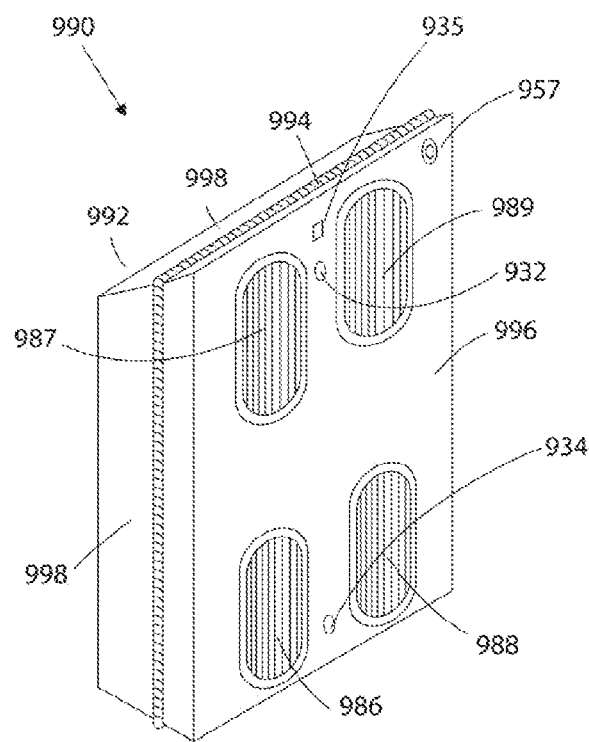
Figure 14:
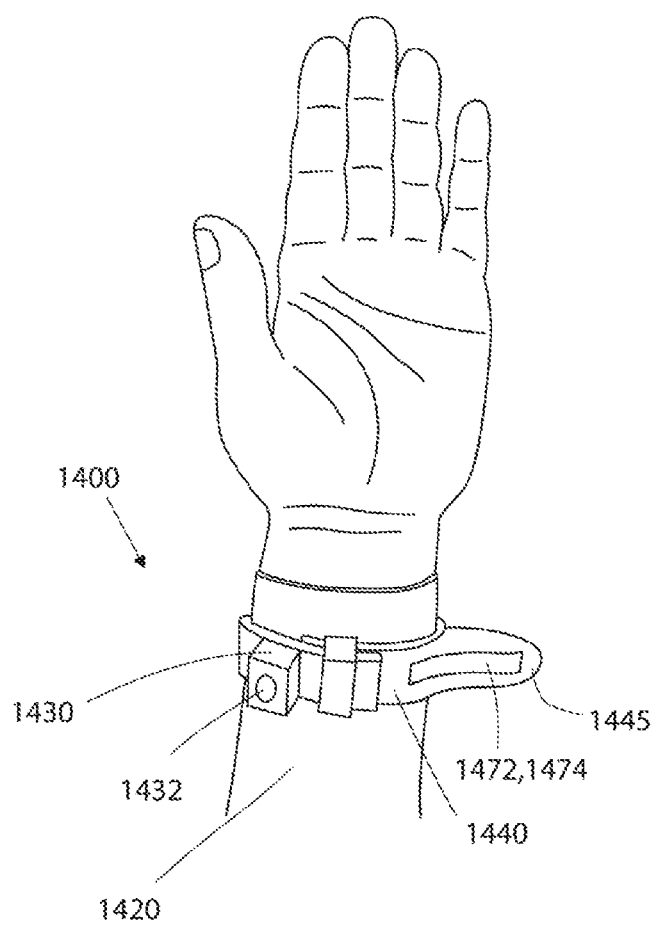
FIG. 14 shows an exemplary wrist or leg device 1400 for attaching to a hand or a leg of the user, for generating a signal to measuring first thrust $T_p$ by Doppler effect, or by measuring and transmitting a value related to the water resistance created by first thrust on the arm or leg of user.

FIGS. 11A and 11B show perspective views from the rear and the front side of a waterproof propulsion container 990, and FIG. 11C shows a cross-sectional view along the line CS5 shown in FIG. 11A of a watercraft 1000 equipped with waterproof propulsion container 990 embedded therein to be exposed from lower surface 1014, to show another embodiment of the present invention. This embodiment, but also other embodiments proposed herein, can be made removable to be used in inflatable or foldable watercrafts, for example but not limited to inflatable kayaks, SUP boards, canoes, rafts, sea kayaks, inflatable body suits for water. Container 990 has a first surface or housing wall 992 that faces the watercraft 1000 when installed, and has a second surface or housing wall 996 that is configured to face waterbody WB when installed to watercraft 1000. Second surface 996 also has the water ingress ports 987, 989 and the water egress ports 986, 988 arranged thereon for the water ducts that lead to respective impellers. Water ducts 987, 989, 986, and 988 can be covered be fixedly installed or removable protection grills. Also, on second surface 996, a water presence sensor 935 can be arranged, and a waterproof on/off button 957 for turning container 990 on for operation or off for storage and non-use. This arrangement allows to turn container 990 on or off regardless of whether it is installed to watercraft 1000 or not. Also, in this embodiment, waterproof propulsion container 990 is equipped with two terminals 940, 942 on the first surface 992 that serve two purposes. Also, passive acoustic detection sensors 932, 934 can be arranged on surface 996, to be in operative connection with water body WB, to detect acoustic signals from an emitter. Acoustic sensors 932, 934 can be arranged distanced from each other along the longitudinal axis of watercraft 1000 or container, such that a relative motion between the paddling device and watercraft 1000, or the arm or leg of the user and watercraft 1000 can be measured, for example by performing Doppler effect measurements between sensors 932, 934 by a controller of watercraft 1000, for example when paddling device 1400 is used with an acoustic or ultrasonic emitter 1432, as shown in FIG. 14.

First, terminals 940, 942 are used for mechanically affixing container 990 to watercraft 1000, for example by the use of attachment devices 916, 917, in the variant shown screws, with the screw heads embedded in pockets 950, 952 in an upper surface 1016 of watercraft 1000, and the screw threads secured to corresponding threads in hollow posts 924, 925 that are arranged inside container 990. Screw heads and pockets 950, 952 are arranged such that the screw head does not protrude over an upper surface 1016 of watercraft 1000. Screw heads of attachment device 916, 917 can additionally covered with a cap for protection of the body of user. The attachment devices 916, 917 traverse the upper surface 1016 of watercraft 1000, and the upper surface 992 of container 990, via an insertion box 1100 that is embedded in watercraft 1000. Insertion box 1100 of watercraft 1000 is designed such that the inner shape of the opening of insertion box 1100 accommodates upper surface 992 of container 990, and side walls 998 of container 990. The opening of insertion box 1100 has a shape that is complementary to a shape of the container 990. Side walls 998 of container 990 are inclined such that container 990 can be wedged and press-fitted into insertion box 1100. A seal bead 994 is arranged either around side wall 998 of container 990, or side walls of insertion box 1100, or both. Seal band 994 can therefore press against walls 998 of container 990 and side walls of insertion box 1100 to avoid water leakage between the two walls. Ultimately, this arrangement allows to provide for waterproof sealing between water body WB and terminals 940, 942 to avoid short circuits between contact terminals 926, 927. In addition, around each terminal 940, 942, a seal pad or seal ring 912, 913 is arranged to cover an area around terminals 940, 942 to provide for additional waterproof sealing. Insertion box 1100 is integrated into a lower surface 1014 of watercraft 1000, such that the laterally protruding side walls 1110 are flush with a lower surface of watercraft 1014.

Second, terminals 940, 942 can serve as contact terminals to charge the battery (not shown) that is located inside container 990, for example via power electronic device 972. Power electronic device 972 is electrically connected to two contact terminals 926, 927, and contact terminals 926, 927 are arranged such that they form connections at a bottom of corresponding hollow posts 924, 925. When attachment devices 916, 917 are removed from watercraft 1000 and container 990, container 990 can be removed from watercraft 1000, and via terminals 940, 942, contact terminals 926, 927 can be contacted with plugs or connectors (not shown) from a battery charger or other device for providing energy to batteries of container 990. In the variant shown, there are two contact terminals in a respective post 924, 925, but it could also be possible to only arranged a single post for attachment, with two contact terminals located therein. Also, power electronic device 972 is mounter to bottom wall of insertion box 1100 or an inner side of second surface 996 that will be facing the water for cooling.

With these two functions, it is possible to provide for a waterproof container 990 that includes a complete propulsions system with motors 963, impellers 962, and water duct 982, batteries, and the necessary sensors and controller that is entirely waterproof and hermetically sealed. No other external devices are needed for the operation. Also, by using terminals 940, 942 that serve the dual purpose for attachment to watercraft 1000, and also as electrical terminals for charging the batteries inside container 990, the design can be simplified, and risks of a water leakage can be further reduced. The batteries do not need to be removable from container 990. In addition, existing watercrafts can be retrofitted with waterproof container 990 for amplified manual paddling or rowing. For example, an opening can be provided in the lower surface of watercraft 1000 of an existing board or other type of hull. Then, an insertion box 1100 that corresponds to a waterproof container 990 can be attached to opening, for example with a glue, epoxy resin, and a water-repellent filling foam for filing up all cavities. In addition, holes towards the upper surface 1016 of watercraft 1000 need to be provided, with a predefined spacing and diameter that corresponds to terminals 940, 942. This allows to removably attach waterproof container 990 with a propulsion system to a watercraft 1000.

Moreover, instead of waterproof container 990, a lightweight waterproof dummy box can be also attached to insertion box 1100, having the same outer dimensions and attachment terminals 940, 942 as container 990, but without any electric and mechanical components inside. This allows to either equip a watercraft 1000 with a powered waterproof container 990, for amplified paddling or rowing, or to equip watercraft 1000 with a dummy box for filling purposes only, to preserve the outer shape of watercraft 1000, if no amplified rowing or paddling is needed.

Figure 12:
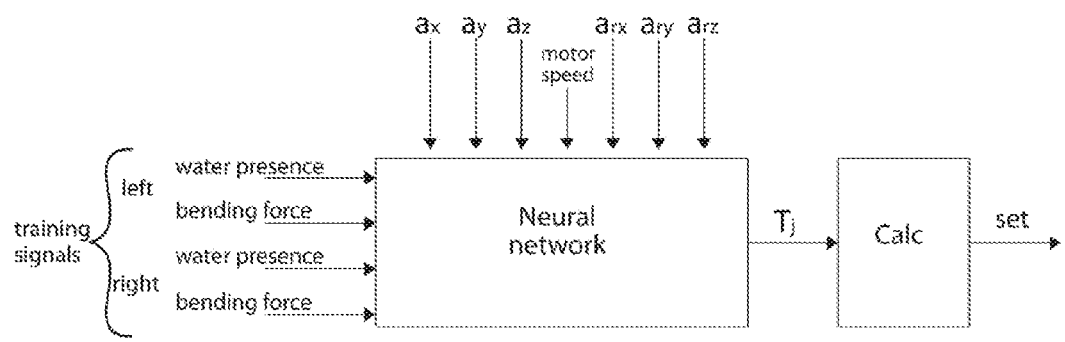
FIG. 12 shows a neuronal network that can be part of the controller controlling a value for second thrust $T_j$ based on acceleration data, according to still another embodiment.

FIG. 12 shows an exemplary embodiment for using artificial intelligence to control the propulsion of second thrust $T_j$ based on acceleration to watercraft 900. Body of watercraft 900 can be subject to many different accelerations other than the ones caused by the manual paddling and/or rowing, and the ones caused by water movements, for example but not limited to waves, turbulences, water currents, rapids, or by watercraft 900 touching or bumping into objects, or other movements caused by paddler or rower himself, such as changing body position, knocking or kicking against watercraft. To reduce these perturbations and other influences on the measurement of the acceleration values that represent the first thrust $T_p$, artificial intelligence can be used to read signals that indicate the first thrust $T_p$, for example an acceleration vector to watercraft 900, to generate the second thrust $T_j$ by controller.

As shown in FIG. 12, an artificial neuronal network for example a convolutional neuronal network, could be used to determine which accelerations from a vector of accelerations are caused by the manual rowing and/or paddling. This neural network can be programmed and run on controller 40. The neural network can be learned by temporarily using a device that somewhat accurately represents the first thrust $T_p$, multiplied by different desired amplification ratio k, as a model function of a favored output or optimal function of neural network, such that signals are learned that will represent a value indicative of the desired second thrust $T_j$. For example, the different measurement principles other than the acceleration-based one discussed herein can be used. Preferably, the bending or flow measurement signals as discussed in FIGS. 4E, 7B, 7C, and 14 could be used as a training signal, multiplied by a desired amplification k, and optionally a weighting function, to generate a signal that represents the desired output of neural network. For example, the force measurement on the paddling/rowing multiplied by a desired amplification factor k can be used as a desired output to generate second thrust $T_j$ by propulsion system 860. The error vector between desired $T_j$ and the actual $T_j$ represented by the acceleration vector can be subject to a cost function calculation that is minimized by mathematical optimization, to optimize the network. It is also possible to use supervised learning, by which the desired output is pre-calculated or pre-measured. Also, as shown in FIG. 12, as a speed of motor of propulsion system influences the acceleration vector, it can also be taken into account by the artificial intelligence. Based on the calculated second thrust $T_j$ by neural network, with Equation (14), a set value for the propulsion system to generate $T_j$ can be generated.

Figure 13A:
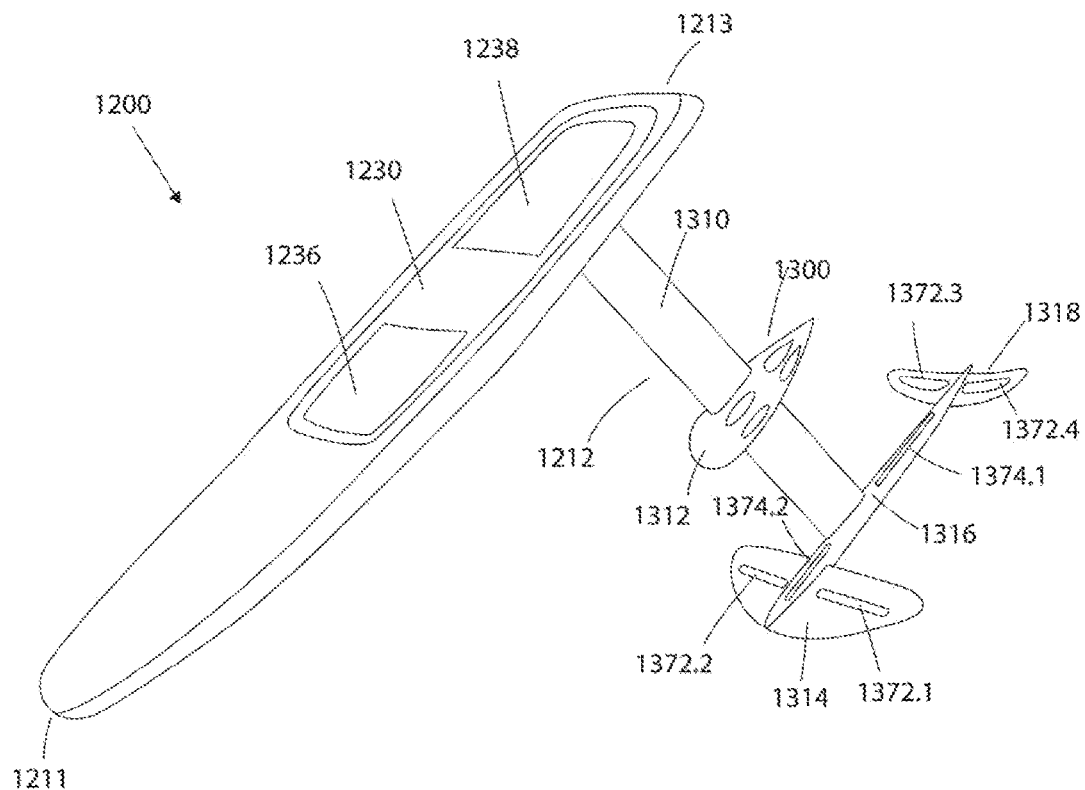
FIG. 13A shows a perspective view of another embodiment showing a hydrofoil-based watercraft 1200 with an underwater propulsion device 1300 designed for intermittent or discontinuous supply of second thrust, with FIG. 13B showing a perspective view of propulsion device 1300, and FIGS. 13C and 13D showing cross-sectional views of propulsion device 1300.

FIG. 13A shows a perspective view of another embodiment, in which a hydrofoil board as a watercraft 1200 is proposed, having a propulsion device 1300 attached to the hydrofoil 1212. Such watercraft 1200 can be manually propelled or propulsed in different ways to manually create the first thrust $T_p$, for example as a SUP board with a paddle, or by leg pump action in which a user standing on the board shifts his weight from the back leg to the front leg standing on watercraft 1200. The propulsion device 1300 is attached to a shaft of the central fin 1310 of the hydrofoil device 1212, but could also be made an integral part of shaft 1316 of hydrofoil 1212 itself, and will create the second propulsive force or thrust. In addition to the other measurements principles for $T_p$ discussed in the other embodiments, a mechanical stress, bending or tension can be measured by different means, to determine a value for $T_p$ that is caused by the leg pump action. For example, a standing area 1230 for the includes a front area 1236 for a front foot, and a rear area 1238 for the rear foot, each the front and rear area 1236, 1238 equipped with a pressure, or force measurement sensor to measure a pressure exerted by each foot of user. These sensors in areas 1236, 1238 are operatively connected to a controller for propulsion device 1300, to analyse the pressure differences between these two areas 1236, 1238 that correspond to the leg pump action, to create a control signal for causing a second thrust $T_j$ substantially proportional to first thrust $T_j$. Also, hull of watercraft 1200 itself can be equipped with a bending or mechanical stress measurement sensor, for example strain gauges, to measure a bending to hull caused by the leg pump action of user causing $T_p$, that can be converted by controller to a control signal to generate the second thrust, where an increased periodic bending indicates an increased periodic $T_p$.

Moreover, the exemplary hydrofoil device 1212 includes a frontal horizontal fin pair 1314, a rear horizontal fin pair 1318, and a longitudinal shaft 1316 arranged substantially in parallel with a longitudinal extension of watercraft 1100, to attach central fin 1310, frontal horizontal fin pair 1314, and rear horizontal fin pair 1318 together. Bending that is exerted on hydrofoil 1212 can be used to measure first thrust $T_p$, and different bending or mechanical stress measurement sensors can be arranged on the frontal horizontal fin pair 1314, a rear horizontal fin pair 1318, and a longitudinal shaft 1316, to measure a bending or mechanical stress that is applied to them, and operatively connected to a controller (not shown) for controlling the propulsion device 1300. For example, this can be done by measuring and analyzing a bending stress between strain gauges 1372.1 and 1372.2 of frontal fin pair 1314, a bending stress between strain gauges 1374.1 and 1374.2 of shaft 1316, or a bending stress between strain gauges 1372.3 and 1372.4 of rear fin pair 1316, or a differential or combined measurement between any of these strain gauges. For simplification and illustration purposes, the complementary strain gauges on the lower surface side of frontal horizontal fin pair 1314, rear horizontal fin pair 1318, and longitudinal shaft 1316 are not shown.

Figure 13B:
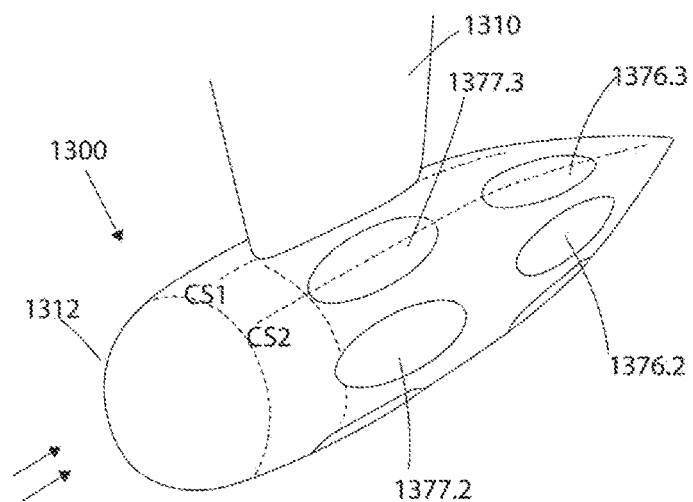
Figure 13C:
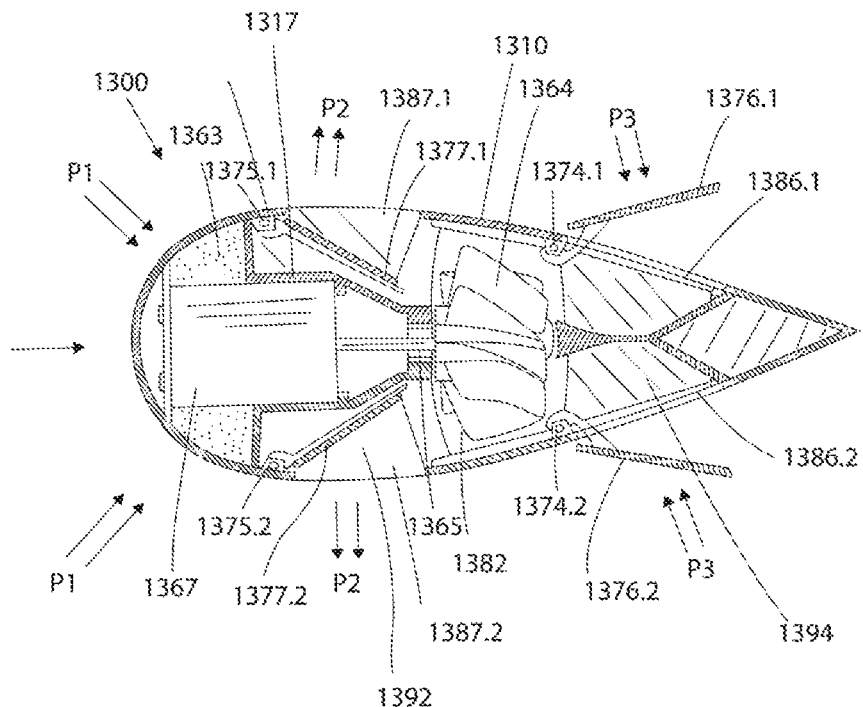
Figure 13D:
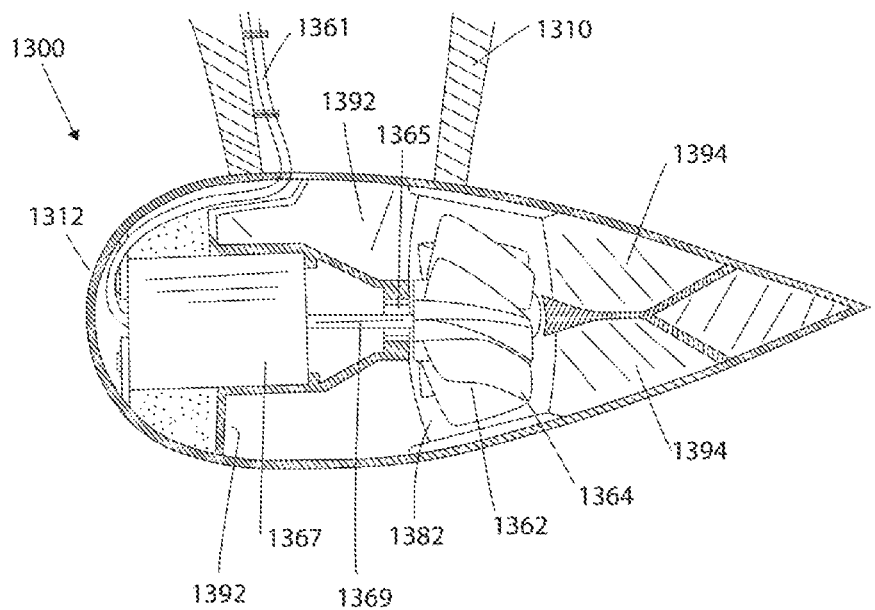

FIG. 13B shows a close-up perspective view and FIGS. 13C and 13D show cross-sectional views along line CS1 and CS2 of FIG. 13B of propulsion device 1300 that can be attached to hydrofoil 1212, or another type of fin to watercraft 1200. In this embodiment, the body 1312 of propulsion device 1300 has a substantially drop-shape with closable water inlet ports 1387 and closable water outlet ports 1386 to minimize the water drag, especially in the state where the propulsion device 1300 not powered. Unlike constantly-powered motors and propulsion devices, as watercraft 1200 is only powered in a pulsating or intermittent fashion, when propulsion device 1300 is not powered, it is preferable to reduce a drag of watercraft to a maximum.

In this embodiment, when unpowered, the hydrodynamic shape of device 1300 is preserved by closable flaps 1376, 1377 for water inlet and outlet ports or openings 1386, 1387, respectively. This is done by doors or flaps 1377.1, 1377.2, 1377.3 for corresponding water inlet ports 1387.1, 1387.2, 1387.3, that are arranged in a negative pressure zone P2 where the water passes by device 1300 at high speed, opening to the interior of device 1300 at the inlet channel 1392, and by doors or flaps 1376.1, 1376.2, 1376.3, for corresponding water outlet ports 1386.1, 1386.2, 1386.3 that are arranged in a positive pressure zone P3 where the water passes by device 1300 at lower speed, opening towards an exterior of device 1300 at outlet channel 1394. In the variant shown, ports 1386, 1387 are circumferentially arranged around body of device 1300, equidistantly spread out. Doors or flaps 1376, 1377 are connected to with hinges 1375.1, 1375.2, 1376.1, 1376.2 upstream of the corresponding openings 1386, 1387 to body of device 1300. Doors or flaps 1376, 1377 can further be operatively connected to a spring or leaflet to body 1312 of device 1300 to assist in the closing or opening of doors or flaps 1376, 1377. Water inlet ports 1387 can be further equipped with a mesh or grille to prevent particles from entering. In a closed position, doors or flaps 1376, 1377 can be fitted to outer surface of body 1312 of device 1300, to minimize water drag.

Motor 1367 can be arranged in the front portion of body 1312, in a sealed compartment 1363 with walls 1317, with a motor shaft passing through a watertight bearing and washer assembly 1365. Impeller 1362 is arranged substantially in the center of the body. As shown in FIG. 13D, a power cable 1361 for motor 1367 is fed via sealed chamber 1362 to shaft 1310 of hydrofoil 1212, to be connected to battery back, power converters, and controller, to be located outside of device 1300, for example in hull of watercraft 1200, so that a diameter and volume of device 1300 can be kept as small as possible, to reduce water drag. With this arrangement, motor 1367 can be powered to create a water flow through channels 1394, 1392 against the usual downstream direction to forcibly close doors or flaps 1377, 1376. In this embodiment of a hydrofoil-equipped device as watercraft 1200, as shown with watercraft 1200, it is possible to design the motor power, channel diameter, and power controller and supply, and amplification factor between $T_p$ and $T_j$ to be able to assist the user to reach over the threshold of thrust required to bring watercraft 1200 into planing speeds, as the thrust required to maintain a planing speed is lower than the threshold to reach the planing speed from a non-planing speed, in particular for a hydrofoil device. Also, only very strong paddlers or surfers could reach that planing speed with pure manual paddling thrust $T_p$. Also, similar closable doors or flaps 1376, 1377 can be arranged for the other embodiments for the inlet and outlet ports, to reduce water drag.

FIG. 14 show another type of paddling device, for example a wrist or ankle device 1400 that can be attached either a hand or leg of the user, or other place on the arm or leg, in the variant shown over a wetsuit 1420, whichever is used to generate the first thrust $T_p$. Each leg or arm of user can be equipped with device 1400. It could also be a device worn between the thumb and index finger. In the variant shown, device 1400 is shown having a strap 1440 to attach to a wrist or ankle of user, similar to a watch strap or lower arm band, with a measurement cantilever or fin 1445 protruding therefrom, to act as a force measurement device when subjected to water flow. Measurement fin 1445 is configured to, upon being subject to a water flow around and next to wrist, to bend proportionally with the intensity of the water flow, such that strain gauge pair 1472, 1474 can measure an intensity of the water flow, that substantially corresponds to a generated first thrust $T_p$ by user, similar to the paddle 580 shown in FIG. 7B. Strain gauge pair 1472, 1474 are operatively connected to signal electronics, a controller, and a wireless communication device, for example arranged in waterproof enclosure 1430 that is attached to strap 1440, to calculate the force of bending and transmit the signals back to controller of a watercraft having a propulsion device, for example to propulsion box 890 and its wireless communication interface, of FIG. 11A, or as also explained with respect to watercraft 300 of FIGS. 4A-4C, for example with a Bluetooth® interface, or other type of wireless communication interface. In a variant, instead of measuring the mechanical stress of bending, a bending angle of measurement fin 1445 can be measured, for example by using optical fiber gratings instead of strain gauges. In combination or instead of strain gauge pair 1472, 1474, a flow meter, for example a mechanical or ultrasonic flow meter, could be used that measures a water flow as a value indicative of the first thrust $T_p$, to measure a water flow in proximity or next to paddling device, when the user is paddling/rowing.

Device 1400 can also include an acoustic or ultrasonic transducer 1432 that is powered by a battery and electronics inside waterproof enclosure 1430. This allows to send an acoustic or ultrasonic short-range signal, for example in the frequency range above 20 kHz, that can be picked up by acoustic sensors 932, 934 of watercraft, operatively connected to a controller for detecting a paddling or rowing motion by the Doppler effect of frequency shift measured between sensors 932, 934, due to a shift in frequency that occurs when device 1400 moves relative to hull of watercraft 1000. This allows the controller to calculate and detect a speed of the rowing or paddling motion, and at the same the controller can detect a presence of the hand or leg of the user inside the water. Based on this relative speed, and the speed of the watercraft if necessary, the controller can calculate a value for controlling propulsion device to establish a second thrust $T_j$, as explained with respect to FIG. 2B and FIGS. 3A-3B.

Device 1400 can also include signal electronics to measure a bending or force value of strain gauge pair 1472, 1474, and a modulation electronics to directly generate an ultrasound signal for transducer 1432 having a modulation that carries the bending or force value. For example, a frequency of ultrasonic signal sent by transducer 1432 can be changed with a change to the bending force on cantilever 1445, or other modulation technique. This signal can be captured by one or more acoustic sensors 932, 934 of watercraft. This allows to combine three functions into device 1400 with a simple arrangement, including the measurement of a value indicative of the first thrust $T_p$, detection of presence of device 1400 inside waterbody, as otherwise no signal is transmitted, and communication of the value to watercraft, in a simple and rapid fashion with very little signal lag. An unidirectional communication from device 1400 to watercraft is established via an acoustic or ultrasound signal, such that no active communication link between device 1400 and watercraft is necessary.

In a variant, it is also possible that controller 40 and propulsion system 60 are not part of the same device, where a preexisting propulsion system wirelessly or in a wired fashion receives signal from controller 40 that receives a signal indicative of the manually generated first thrust $T_p$, to calculate and send a signal to propulsion system 60 to generate second thrust $T_j$. For example, with respect to paddling device 1400, or paddling or rowing devices shown in FIG. 4E, 5, 7B-7C, or 14, these devices could be equipped with a controller 40 to calculate a value for second thrust $T_j$ within the paddling or rowing device, and thereafter send a signal indicative of the second thrust $T_j$ to the respective propulsion system, for example by sending a set value for the electronic speed control of motors of propulsion system in a wireless fashion. This allows to equip or retrofit preexisting propulsion systems with the proposed method and system that allows to amplify a manually generated first thrust $T_p$.

In sum, the embodiments of the proposed powered watercraft system and device, waterproof container, or method of controlling a propulsion device of a watercraft use a propulsion device that operates together with the detection and measurement of natural or manual movements performed by a user of the watercraft to provide motion to the watercraft by first thrust $T_p$, to determine an second thrust of propulsion system $T_j$ that will assist the user, where the second thrust $T_j$ is at least partially contemporary with the presence of the first manual thrust $T_p$, and preferably also substantially proportional to first manual thrust $T_p$ and in sync with $T_p$, providing for a combined thrust $T_p+T_j$ to power the watercraft. The paddling motion of the user on the watercraft can also include but is not limited to a paddling motion with a paddle of a kayak, canoe, raft, SUP, a rower with an oar of a rowing boat, but even conventional feet paddling motion of a diver, snorkeler, swimmer, body boarder, riverboard, or hydrospeed board with swimfins. This type of powering of the watercraft provides for minimal interference with the natural movements of the user. In addition, a natural feeling and experience of paddling or rowing, the necessary timings of paddling/rowing for successful maneuvering, and the consequential provision of a naturally-feeling propulsive force is preserved. Specifically, the already present first thrust $T_p$ is simply amplified or assisted, such that the user has full control over the second thrust $T_j$ of propulsion system by using his already known and natural rowing or paddling reflexes and techniques, without using any additional control buttons and devices to control $T_j$.

There is no constant on/off propulsion system that automatically removes the feeling of naturally powered propulsion by the user. Naturally acquired timing motions of the user are preserved, and user and design of the watercraft are strongly simplified and reduced in weight due to smaller power requirements as compared to traditional powered watercrafts. For example, in the case of a surfboard, many surfers have established paddling timing when approaching a wave, catching the wave, and standing up on the board, all of these movements being highly complex. With the proposed powered watercraft, these natural timings that have been acquired by training will not be overridden by constantly powered device, but will be further supported, so that a natural feel of the surfing is preserved. These features are particularly interesting for the large number of aging surfers and other watersports enthusiasts who do not want to give up on the sport due to lack of fitness. Similarly, kayakers, paddler, rowers, rafters, canoers, SUP boarders, divers, swimmers, snorkelers, river boarders, can operate their respective watercrafts with the same or similar timing on the paddling motion, without that the dynamic of the watercraft, is substantially altered. Moreover, as the propulsion device generating second thrust $T_j$ is preferably not attached to the body part of user that provides for the first thrust $T_p$, for example the arms or legs of user, or is arranged not to impede with the motions that provide for first thrust $T_p$, the natural propulsion motions are unhindered and preserve substantially their natural feeling.

In addition, as compared to constant powered watercrafts, because the additional $T_j$ generated is comparatively small, in most countries, there will be no need to have them registered as powered watercrafts, and there will be also no need to acquire a special boating license. The power delivered by the assisting propulsive force can be chosen to keep the watercrafts outside of the duty to register them at boating and watersports authorities, and being subject to regular inspection, or avoid being banned by the authorities altogether from certain water bodies.

Moreover, another advantage is the reduction of power consumption, and the consequential increased run time of the watercraft, as compared to constantly powered devices. Operation times can therefore be much longer, and the weight of the device can be kept low. Different assistance levels can be set, for example by adding to the naturally generated first thrust by 50%, 100%, 200%, etc., with the second thrust from propulsion system. Therefore, not only can the assistance be chosen to have reduced interferences with the natural way of surfing, kayaking, paddling, rowing, body boarding, rafting, etc., but can also be designed to reduce the power consumption to a maximum. This allows to reduce weight of the system, choose motors for the powered watercraft having less power generation and consumption, less weight, smaller diameter, and need to generate less thrust than the ones used for constant powered devices, as the system is designed to merely assist the user.

Another advantage of that results from the embodiments is the provision of powered watercrafts that can be used for users having different skill set and different endurance performance. For example, while an experienced and fit paddler/rower may use a watercraft that is not equipped with any propulsion, or use a watercraft in which the assistance level is set to a low value, while a second, less experienced and less fit paddler can use the watercraft with the powered equipment, or a watercraft with the assistance level to a higher value, so that he or she can keep up with the experienced paddler. This also allows to use the powered watercraft for beginner groups, so they can keep up and share a similar experience as an experienced guide.

While the invention has been disclosed with reference to certain preferred embodiments, numerous modifications, alterations, and changes to the described embodiments, and equivalents thereof, are possible without departing from the sphere and scope of the invention. For example, it is possible that the different measurement principles of the different embodiments are combined for an improved detection, measurement and analysis. Accordingly, it is intended that the invention not be limited to the described embodiments, and be given the broadest reasonable interpretation in accordance with the language of the appended claims.

The invention claimed is:

1. A powered watercraft system for a user comprising:
   a watercraft body;
   a propulsion system;
   a sensor configured to measure a value indicative of a time-variable first propulsive force acting on the watercraft body resulting from an engagement by arm motion of the user with water at a side of the watercraft body; and
   a controller configured control the propulsion system to generate a second propulsive force for powering the watercraft body based on the value indicative of the first propulsive force, the generated second propulsive force being at least partially contemporary with the first propulsive force.

2. The powered watercraft according to claim 1, wherein the controller is configured to process the value indicative of the first propulsive thrust to generate a set value for the propulsion system to generate the second propulsive force to be substantially proportional to a factor k to the first propulsive force.

3. The powered watercraft according to claim 1, wherein the sensor is external to the watercraft body and the propulsion system, and is operatively connected to the controller in a wireless or wired fashion.

4. The powered watercraft according to claim 3, wherein the sensor includes a bending measurement device operatively attached to a paddling device operated by the arm motion of the user, and the value indicative of the first propulsive force is based on a bending of at least a part of the paddling device.

5. The powered watercraft according to claim 3, wherein the sensor includes a flow meter operatively attached to a paddling device operated by the arm motion of the user, and the value indicative of the first propulsive force is based on a water flow measured by the flow meter.

6. The powered watercraft according to claim 1, wherein the sensor includes an accelerometer arranged at the watercraft body, and the value indicative of the first propulsive force is based on an acceleration of the watercraft body caused by the first propulsive force.

7. A powered watercraft for a user comprising:
a watercraft body;
a propulsion system;
a device for receiving a value indicative of a time-variable first propulsive force acting on the watercraft body resulting from an engagement by arm motion of the user with water at a side of the watercraft body; and
a controller for controlling the propulsion system to generate a second propulsive force for powering the watercraft body based on the value indicative of the first propulsive force, the generated second propulsive force being at least partially contemporary with the first propulsive force.

8. The powered watercraft according to claim 7, wherein the device for receiving receives wireless data or wired data from a sensor external to the powered watercraft that generates the value indicative of the first propulsive force.

9. The powered watercraft according to claim 7, wherein the device for receiving receives wired data from a sensor arranged on the watercraft body that generates the value indicative of the first propulsive force.

10. The powered watercraft according to claim 7, wherein the controller is configured to process the value indicative of the first propulsive thrust to generate a set value for the propulsion system to generate the second propulsive force to be substantially proportional to a factor k to the first propulsive force.

11. A propulsion container for attachment to a personal watercraft for a user, the container comprising:
a propulsion system;
a device for receiving a value indicative of a time-variable first propulsive force acting on the personal watercraft resulting from an engagement by arm motion of the user with water at a side of the personal watercraft; and
a controller for controlling the propulsion system to generate a second propulsive force for powering the personal watercraft based on the value indicative of the first propulsive force, the generated second propulsive force being at least partially contemporary with the first propulsive force.

12. The propulsion container according to claim 11, wherein the controller is configured to process the value indicative of the first propulsive thrust to generate a set value for the propulsion system to generate the second propulsive force to be substantially proportional to a factor k to the first propulsive force.

13. The propulsion container according to claim 11, further comprising:
a sensor operatively connected to the device for receiving, configured to measure the value indicative of the first propulsive force resulting from the engagement of the user by the arm motion.

14. The propulsion container according to claim 13, wherein the sensor includes an accelerometer arranged to measure an acceleration of the propulsion container caused by the first propulsive force.

15. The powered watercraft system according to claim 1, wherein the engagement of the user by the arm motion includes at least one of a paddling motion by direct water engagement of a hand of the user, a paddling motion caused by the arm motion with a paddle, and a rowing motion caused by the arm motion with an oar.

16. The powered watercraft according to claim 7, wherein the engagement of the user by the arm motion includes at least one of a paddling motion by direct water engagement of a hand of the user, a paddling motion caused by the arm motion with a paddle, and a rowing motion caused by the arm motion with an oar.

17. The propulsion container according to claim 11, wherein the engagement of the user by the arm motion includes at least one of a paddling motion by direct water engagement of a hand of the user, a paddling motion caused by the arm motion with a paddle, and a rowing motion caused by the arm motion with an oar.

18. The powered watercraft system according to claim 1, wherein when the first propulsive force is decreasing, the controller is configured control the propulsion system to generate the second propulsive force to limit a deceleration of the watercraft body to a threshold value.

19. The powered watercraft according to claim 7, wherein when the first propulsive force is decreasing, the controller is configured control the propulsion system to generate the second propulsive force to limit a deceleration of the watercraft body to a threshold value.

20. The propulsion container according to claim 11, wherein when the first propulsive force is decreasing, the controller is configured control the propulsion system to generate the second propulsive force to limit a deceleration of the personal watercraft to a threshold value.

* * * * *